US008959442B2

(12) United States Patent
Chilimbi et al.

(10) Patent No.: US 8,959,442 B2
(45) Date of Patent: Feb. 17, 2015

(54) MEMORY ALLOCATION VISUALIZATION FOR UNMANAGED LANGUAGES

(75) Inventors: Trishul A. Chilimbi, Seattle, WA (US); Bongshin Lee, Issaquah, WA (US); George G. Robertson, Northeast Harbor, ME (US)

(73) Assignee: Microsoft Corporation, Redmond, WA (US)

(*) Notice: Subject to any disclaimer, the term of this patent is extended or adjusted under 35 U.S.C. 154(b) by 553 days.

(21) Appl. No.: 12/814,194

(22) Filed: Jun. 11, 2010

(65) Prior Publication Data

US 2011/0307828 A1 Dec. 15, 2011

(51) Int. Cl.
G06F 3/048 (2013.01)
G06F 11/36 (2006.01)
G06F 11/32 (2006.01)
G06F 11/34 (2006.01)

(52) U.S. Cl.
CPC .......... *G06F 11/3636* (2013.01); *G06F 11/323* (2013.01); *G06F 11/3476* (2013.01)
USPC ........................................................ 715/764

(58) Field of Classification Search
CPC ...................................... G06F 11/32–11/3664
USPC .................. 715/764, 802; 717/124–131, 135
See application file for complete search history.

(56) References Cited

U.S. PATENT DOCUMENTS

| | | | | |
|---|---|---|---|---|
| 2,629,827 A * | 2/1953 | Eckert, Jr. et al. | | 360/54 |
| 5,124,989 A * | 6/1992 | Padawer et al. | | 714/38.13 |
| 5,408,650 A * | 4/1995 | Arsenault | | 717/124 |
| 5,740,440 A * | 4/1998 | West | | 717/125 |
| 5,850,562 A * | 12/1998 | Crump et al. | | 713/1 |
| 5,953,530 A * | 9/1999 | Rishi et al. | | 717/127 |
| 6,202,199 B1 * | 3/2001 | Wygodny et al. | | 717/125 |
| 6,275,956 B1 * | 8/2001 | On et al. | | 717/125 |
| 6,351,845 B1 | 2/2002 | Hinker | | |
| 6,658,652 B1 * | 12/2003 | Alexander et al. | | 717/128 |
| 6,658,653 B1 * | 12/2003 | Bates et al. | | 717/131 |
| 6,782,462 B2 * | 8/2004 | Marion et al. | | 711/170 |
| 6,817,011 B1 * | 11/2004 | Reynolds | | 717/130 |
| 6,947,052 B2 | 9/2005 | Jeremizassen | | |

(Continued)

OTHER PUBLICATIONS

"Electromagnetic Waves Can Be Used As a Data Memory" by Mikko Milenin, dated Jul. 3, 2009, retrieved from http://koti.kapsi.fi/~mmalinen/.*

(Continued)

*Primary Examiner* — Tuyetlien Tran
*Assistant Examiner* — Patrick Ramsey
(74) *Attorney, Agent, or Firm* — Steve Wight; Judy Yee; Micky Minhas

(57) ABSTRACT

A "Memory Allocation Visualizer" provides a dynamic visualization that animates memory allocation event trace information over a time period of execution of a program. Consequently, the Memory Allocation Visualizer provides a visualization and understanding of a program's memory system behavior. Various modes of display with custom color mappings and zooming allow the user to see how heaps are used over time (e.g., by allocation type, age, size, thread id, etc.). Custom displays also allow the user to detect potential memory leaks and fragmentation problems. Composable filters enable the user to focus on specific issues. Various techniques are used to enable processing of a very large numbers of trace events while enabling rapid response to visualization view changes.

20 Claims, 12 Drawing Sheets
(4 of 12 Drawing Sheet(s) Filed in Color)

(56) References Cited

U.S. PATENT DOCUMENTS

| | | | | |
|---|---|---|---|---|
| 7,178,134 | B2* | 2/2007 | Groeschel | 717/128 |
| 7,539,833 | B2* | 5/2009 | Krauss et al. | 711/170 |
| 7,904,493 | B2* | 3/2011 | Schmelter et al. | 707/820 |
| 7,971,010 | B2* | 6/2011 | Schmelter et al. | 711/159 |
| 8,132,159 | B1* | 3/2012 | Lindahl et al. | 717/128 |
| 8,245,209 | B2* | 8/2012 | Gupta | 717/153 |
| 2003/0163661 | A1* | 8/2003 | Marion et al. | 711/170 |
| 2004/0216091 | A1* | 10/2004 | Groeschel | 717/128 |
| 2005/0091646 | A1* | 4/2005 | Chilimbi et al. | 717/130 |
| 2006/0136530 | A1* | 6/2006 | Rossmann | 707/206 |
| 2008/0148102 | A1* | 6/2008 | Tseytin et al. | 714/37 |
| 2008/0155342 | A1* | 6/2008 | O'Callahan | 714/38 |
| 2008/0163176 | A1* | 7/2008 | Krauss | 717/128 |
| 2008/0288741 | A1* | 11/2008 | Lee et al. | 711/200 |
| 2008/0301646 | A1* | 12/2008 | Gupta | 717/127 |
| 2008/0301717 | A1* | 12/2008 | Chilimbi et al. | 719/329 |
| 2009/0094589 | A1* | 4/2009 | Gupta et al. | 717/154 |
| 2010/0037025 | A1* | 2/2010 | Zheltov et al. | 711/128 |
| 2010/0295856 | A1* | 11/2010 | Ferreira et al. | 345/441 |
| 2011/0307828 | A1* | 12/2011 | Chilimbi et al. | 715/802 |
| 2014/0089627 | A1* | 3/2014 | Vaishampayan et al. | 711/170 |

OTHER PUBLICATIONS

Wikipedia entry on "Delay line memory", retrieved from http://en.wikipedia.org/wiki/Delay_line_memory.*

"The Visualization of Dynamic Memory Management in the Icon Programming Language" by Ralph E. Griswold and Gregg M. Townsend, University of Arizona Technical Report TR 89-30 published Dec. 1989, retrieved from http://www.cs.arizona.edu/research/reports.html.*

Tony Printezis and Richard Jones. 2002. GCspy: an adaptable heap visualisation framework. SIGPLAN Not. 37, 11 (Nov. 2002), 343-358.*

A. M. Cheadle, A. J. Field, J. W. Ayres, N. Dunn, R. A. Hayden, and J. Nystrom-Persson. 2006. Visualising dynamic memory allocators. In Proceedings of the 5th international symposium on Memory management (ISMM '06). ACM, New York, NY, USA, 115-125.*

Choudhury, A. N. M. I., K. C. Potter, S. G. Parker, Interactive visualization for memory reference traces, Proc. Eurographics / IEEE VGTC Symposium on Visualization, EuroVis 2008, Comput. Graph. Forum, May 26-28, 2008, vol. 27, No. 3, pp. 815-822, Eindhoven, The Netherlands.

Jurenz, M., R. Brendel, A. Knüpfer, M. S. Müller, W. E. Nagel, Memory allocation tracing with VampirTrace, Proc. of the 7th Int'l Conf. on Computational Science, ICCS 2007, May 27-30, 2007, vol. 2, pp. 839-846, Beijing, China.

McConnell, W. C., Visualizing memory utilization for the purpose of vulnerability analysis, Virginia Polytechnic Institute and State University, Master of Science Thesis, May 28, 2008, Blacksburg, Virginia.

Moreta, S., A. Telea, Visualizing dynamic memory allocations, Proc. of the 4th IEEE Int'l Workshop on Visualizing Software for Understanding and Analysis, VISSOFT 2007, Jun. 25-26, 2007, pp. 31-38, Banff, Alberta, Canada.

Reiss, S. P., Visualizing the Java heap to detect memory problems, 5th IEEE Intl Workshop on Visualizing Software for Understanding and Analysis, VISSOFT 2009, Sep. 25-26, 2009, pp. 73-80, Edmonton, Alberta, Canada.

Denning, Peter J., "The Locality Principle", Journal: Communications of The ACM—CACM, vol. 48, No. 7, pp. 19-24, Jul. 2005.

* cited by examiner

MEMORY ALLOCATION VISUALIZATION FOR UNMANAGED LANGUAGES

BACKGROUND

1. Technical Field

A "Memory Allocation Visualizer" provides various techniques for generating dynamic, interactive, customizable animated visualizations of memory allocation event trace information recorded or captured during program execution.

2. Background

Due to the large performance gap between processor speeds and memory and disk access times, a program's memory system performance is one of the key determinants of its overall performance. The memory system behavior of software is determined by a complex set of factors that include code and data size, program data structures used, mapping of code and data to memory addresses, how they are accessed, and architectural considerations such as the sizes of caches and main memory. Consequently, programmers often have little idea of a program's memory systems behavior and often write programs with poor memory system performance.

As is well known to those skilled in the art, among the most common problems in the memory performance of various software elements are "memory fragmentation" and "memory leaks." Memory fragmentation involves a failure to reuse memory that has been freed. Excessive fragmentation can lead to more costly paging behavior (i.e., more page faults, and consequently, more slow disk accesses). Memory leaks involve a failure to free memory that is no longer in use. Memory leaks can lead to running out of memory, increased paging activity, software crashes, degraded OS performance, etc. In addition, there is a wide variety of program behaviors, such as repeated reallocation of the same memory, too large memory footprint, too many small allocations, etc., that can result in poor memory performance.

Some of these memory allocation problems can be discovered using conventional static analysis tools. Unfortunately, conventional static analysis tools are known to report many false positives with respect to suspected memory usage problems. Moreover, programmers are often interested in optimizing program performance for specific scenarios and want to understand the dynamic behavior of the program over time for the scenarios of interest. However, analysis of the dynamic behavior is problematic when looking at any given point in time during the execution of the program, because of lack of knowledge of future events. For example, what appears to be a potential fragmentation or leak problem could change in the future when that memory block is reused or freed. Static analysis tools simply do not provide sufficient information for properly evaluating these types of dynamic memory scenarios.

Use of type-safe managed languages such as Java or C# eliminates many memory leaks. However, leaks are still possible because of unnecessary object references. In addition, use of managed languages is not generally considered appropriate for performance-critical software because it increases overhead and decreases the programmer's ability to do low-level optimization of data structures. Hence, unmanaged languages such as C or C++ continue to be used for performance-critical software. While a number of recent memory allocation visualization efforts address object reference patterns in managed languages, they are of less value for understanding memory allocation problems in unmanaged languages.

Significant research has been done on memory analysis and visualization tools. For example, two basic approaches are often used to analyze memory problems. Static analysis tools, mentioned above, catch potential problems without executing the program. While these do not cause any runtime overhead, they tend to have many false positives because they lack detailed information only available from observing the dynamic behavior of the running program.

In contrast, dynamic analysis tools do monitor the dynamic behavior by instrumenting the program, thus yielding better analysis results at the cost of significant runtime overhead. Statistical and sampling approaches reduce that overhead while retaining the benefits of dynamic analysis. To reduce the overhead even further, various techniques use ECC-Memory hardware to monitor memory use. For managed languages, several dynamic analysis tools use object reference graphs to discover unneeded references to objects. These include an automated analysis tool for Java™ programs, and object ownership profiling. However, all these tools look for specific memory problems (typically memory leaks) and do not support memory behavior exploration or detection of memory fragmentation.

Visualization has been used for dynamic memory analysis in a number of ways. One of the earliest examples displayed a map of memory in a 2D layout, color coded memory blocks by data type, and used animation to show the changes to memory over time. A related technique also used a 2D map, but used the x-axis to represent time and the y-axis to represent memory address. In this system, color coding was used to show different data attributes. However, these conventional systems do not support a variety of views, filters and features that are generally sufficient to enable memory behavior exploration and easy detection of common memory problems such as leaks and fragmentation.

In fact, while early visualization systems focused on memory events, much of the later work focused on higher level object ownership. This is especially apparent in various techniques for leak detection for managed languages. For example, one such system helps to discover unneeded references to stale objects in Java™ programs by constructing and visualizing object reference graphs. A related system visualized type points-from graphs to find unneeded references to objects in garbage-collected languages. Yet another conventional process operated by constructing and visualized a simplified memory ownership graph to reveal memory problems in the Java™ heap. However, these techniques are of limited utility for unmanaged languages.

SUMMARY

This Summary is provided to introduce a selection of concepts in a simplified form that are further described below in the Detailed Description. This Summary is not intended to identify key or essential features of the claimed subject matter, nor is it intended to be used in determining the scope of the claimed subject matter.

In general, a "Memory Allocation Visualizer," as described herein, provides various techniques for constructing visualizations of memory system behavior by animating memory allocation event trace information over a time period of execution of a program. More specifically, the Memory Allocation Visualizer generates dynamic, interactive, customizable animations from memory allocation event trace information recorded during program execution. This recorded memory information is also referred to herein as an "event trace log" (ETL), or an "event tracing log."

Various modes of display of the animated visualizations allow the programmer to see how heaps are used over time (e.g., by allocation type, age, size, thread id, etc.), and to detect potential memory leaks and fragmentation problems. Zooming is supported to enable the programmer to see finer detail with respect to memory usage and allocation. In various embodiments, composable filters allow the programmer to focus on specific heaps, threads, sources, allocation size, functions, or process names. In addition, in various embodiments, the programmer may add annotations to events shown in the visualization as understanding of the trace develops over time. Consequently, the Memory Allocation Visualizer provides a useful tool that assists programmers during performance tuning phases of their software development effort.

In view of the above summary, it is clear that the Memory Allocation Visualizer described herein provides various techniques for generating dynamic, interactive, customizable animated visualizations of memory allocation event trace information recorded or captured during program execution. In addition to the just described benefits, other advantages of the Memory Allocation Visualizer will become apparent from the detailed description that follows hereinafter when taken in conjunction with the accompanying drawing figures.

DESCRIPTION OF THE DRAWINGS

The file of this patent contains at least one drawing executed in color. Copies of this patent with color drawing(s) will be provided by the Patent and Trademark Office upon request and payment of the necessary fee.

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Memory Allocation Visualizer," as described herein, provides various techniques for generating dynamic, interactive, customizable animated visualizations of memory allocation event trace information recorded or captured during program execution. Such visualizations are of significant value when developing computer software since one key determinant of a system's overall performance is its memory system performance. For example, a software program's memory system behavior can lead to a variety of performance problems such as, for example, memory fragmentation and memory leaks.

The Memory Allocation Visualizer helps to address such issues by providing an animated interactive visualization that shows the dynamic memory system behavior of a program over some time period of its execution. The animation constructed by the Memory Allocation Visualizer visualizes memory allocation events from a trace log, showing changes to memory over time in a 2D memory map display. This helps programmers understand their programs' memory system behavior.

Advantages of the Memory Allocation Visualizer include various modes of display with custom color mappings and zooming that allow the programmer to see in more detail how heaps are used over time (by allocation type, age, size, or thread id). Further, customizable displays provided by various embodiments of the Memory Allocation Visualizer allow the programmer to quickly detect memory problems such as, for example, potential memory leaks and fragmentation problems. Further, composable filters and the ability to set breakpoints when events occur at a specified address (via an interactive user interface) enable the programmer to focus on specific issues. In addition, the Memory Allocation Visualizer provides the user with the capability to insert annotations into the visualization, thereby allowing the programmer to make notes about discoveries as understanding of the memory trace develops over time. Finally, the Memory Allocation Visualizer achieves rapid response to visualization view changes and filter changes despite processing a huge number of trace events, using the implementation techniques described herein.

1.1 System Overview

Figure 1:
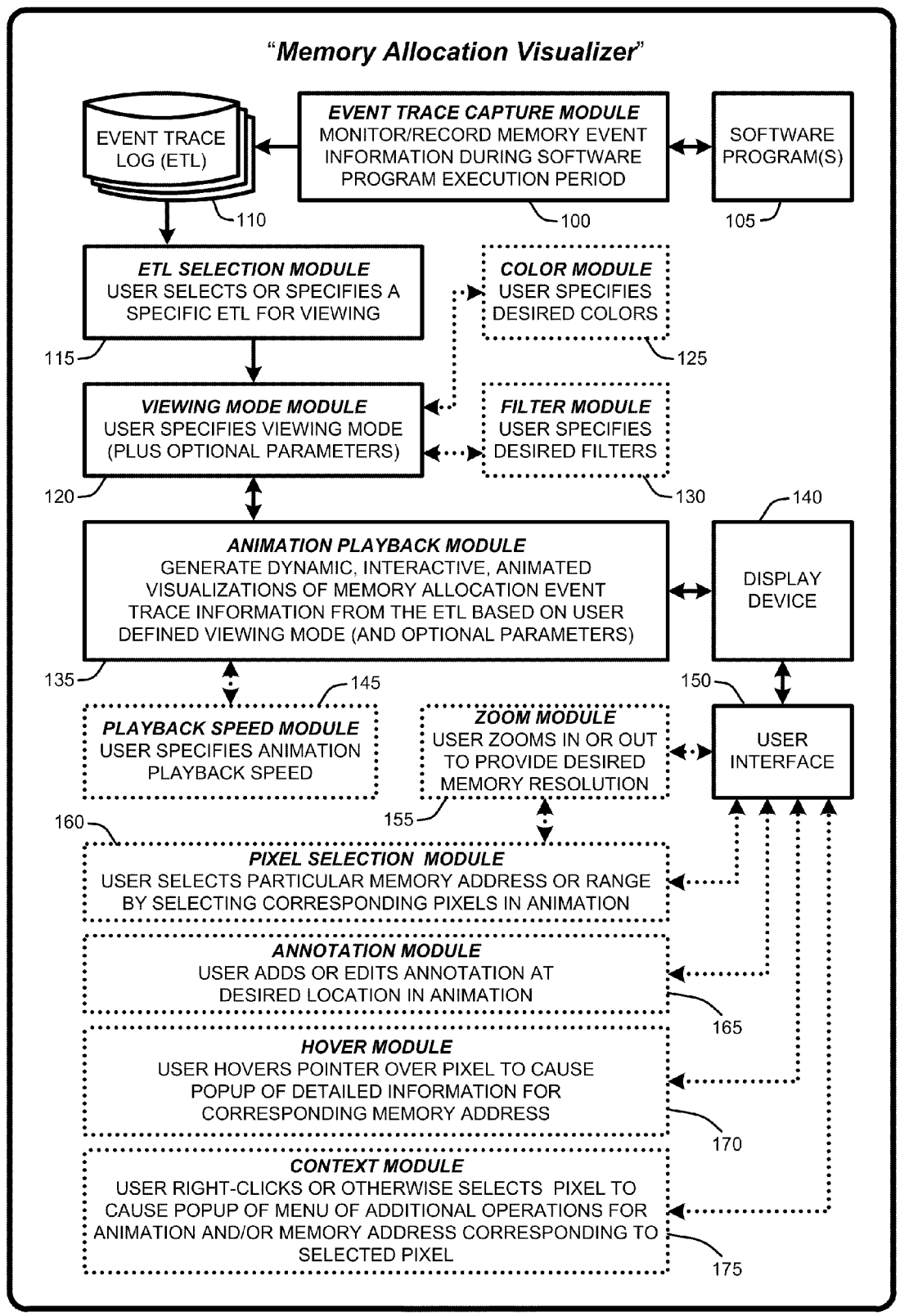
FIG. 1 provides an exemplary architectural flow diagram that illustrates program modules for implementing a "Memory Allocation Visualizer" for generating dynamic, interactive, customizable animated visualizations of memory allocation event trace information recorded or captured during program execution, as described herein.

As noted above, the "Memory Allocation Visualizer" provides various techniques for generating dynamic, interactive, customizable animated visualizations of memory allocation event trace information recorded or captured during program execution. The processes summarized above are illustrated by the general system diagram of FIG. 1. In particular, the system diagram of FIG. 1 illustrates the interrelationships between program modules for implementing various embodiments of the Memory Allocation Visualizer, as described herein. Furthermore, while the system diagram of FIG. 1 illustrates a high-level view of various embodiments of the Memory Allocation Visualizer, FIG. 1 is not intended to provide an exhaustive or complete illustration of every possible embodiment of the Memory Allocation Visualizer as described throughout this document.

In addition, it should be noted that any boxes and interconnections between boxes that may be represented by broken or dashed lines in FIG. 1 represent alternate embodiments of the Memory Allocation Visualizer described herein, and that any or all of these alternate embodiments, as described below, may be used in combination with other alternate embodiments that are described throughout this document.

In general, as illustrated by FIG. 1, the processes enabled by the Memory Allocation Visualizer begin operation by using an event trace capture module 100 to monitor or record memory allocation event information over some period during execution of a software program 105. Note that this period can be the entire runtime of the program, or can be some user specified period. The recorded information is stored to an event trace log (ETL) 110. Note that a separate ETL 110 is captured for each software program 105 or period of interest for particular software programs.

Next, since the user is provided with the capability to capture a plurality of ETLs, an ETL selection module 115 provides an interface that allows the user to identify, select or specify a specific ETL to be used to generate the corresponding interactive animation of memory allocation events.

A viewing mode module 120 provides an interface that allows the user to specify a desired viewing mode of the animation, as well as additional optional parameters. Viewing modes are described in further detail in Section 2.3 through 2.5, and include viewing the memory information contained in the ETL by allocation, by age, by size, by threads, by fragmentation, and by likely leaks. Among the optional parameters are the user selected or specified colors for particular allocation events or types that are specified via a color module 125, and various filters that are specified via a filter module 130. Note that these optional parameters are discussed in further detail in Section 2, and are further illustrated with respect to various figures.

Once all the parameters (i.e., viewing mode, colors, filters, etc.) have been specified, this information is provided to an animation playback module 135 that generates a dynamic, interactive, animated visualization of memory allocation trace information from the selected ETL based on the user defined viewing mode (and optional parameters). This animation is then provided to a display device 140 for playback to the user. Note that the various parameters and the viewing mode can be changed during playback (see discussion of elements 120 through 130 in the preceding paragraph), thereby causing the animation playback module 135 to change the animation in accordance with the current user settings. Note also that the user can perform any actions that are typical with an animation playback of any type, including, for example, rewind, fast forward, pause, restart, stop, adjust playback speed (via a playback speed module 145), etc. Note also that the animation may be modified in real-time during playback of the animation via a user interface 150, as discussed in further detail below.

In particular, the aforementioned user interface 150 is provided to allow the user to optionally interact with the animation during playback. For example, an optional zoom module 155 is provided that allows the user to zoom in or out of the animation to provide desired memory resolution. As discussed in further detail below, particular memory addresses or address ranges are mapped to individual pixels in the animation such that user identification or selection of particular memory addresses or ranges is accomplished by identifying or selecting corresponding pixels in the animation via a pixel selection module 160. In other words, each pixel in a region of the animation is a user selectable graphical representation of one or more contiguous memory addresses in the range of memory addresses that appear in the log. Further, each pixel is dynamically color coded during playback to represent an allocation status of the corresponding memory addresses as they existed during a corresponding time period of the execution of the computer program. Another optional user interaction option includes an annotation module 165 that allows the user to add, delete, or edit an annotation at a desired location in animation. In addition, an optional hover module 170 allows the user to hover pointer over a pixel to cause the popup of detailed information for corresponding memory addresses. Finally, an optional context module 175 allows the user right-click or otherwise identifies or selects a pixel of the animation to cause the popup of a menu of additional operations for animation and/or memory address corresponding to selected pixel for generating dynamic, interactive, customizable animated visualizations of memory allocation event trace information recorded or captured during program execution.

2.0 Operational Details of the Memory Allocation Visualizer

The above-described program modules are employed for implementing various embodiments of the Memory Allocation Visualizer. As summarized above, the Memory Allocation Visualizer provides various techniques for generating dynamic, interactive, customizable animated visualizations of memory allocation event trace information recorded or captured during program execution. The following sections provide a detailed discussion of the operation of various embodiments of the Memory Allocation Visualizer, and of exemplary methods for implementing the program modules described in Section 1 with respect to FIG. 1.

In particular, the following sections provides examples and operational details of various embodiments of the Memory Allocation Visualizer, including: an operational overview of the Memory Allocation Visualizer; composable filters (i.e., user selectable or definable filters for use in constructing the animation); memory behavior over time by user selectable attribute (i.e., viewing modes for constructing the animation); memory fragmentation; memory leaks; implementation details; and garbage collection for managed languages.

2.1 Operational Overview

As noted above, the Memory Allocation Visualizer-based processes described herein provide various techniques for generating dynamic, interactive, customizable animated visualizations of memory allocation event trace information recorded or captured during program execution.

The Memory Allocation Visualizer begins operation with an event tracing log (ETL) that captures heap alloc, realloc, and free events along with call stacks for each event. Note that other memory events may also be defined and captured by the event tracing log. There are a number of conventional techniques for capturing such information. For example, the well-known Event Tracing for Windows® (ETW) is a general-purpose, high-speed tracing utility application provided by the Windows® operating system. However, it must be understood that the use of ETW for capturing the information recorded to the event tracing logs, as discussed below, is provided only for purposes of explanation, and that any desired application or utility can be used for capturing or recording this information without departing from the intended scope of the Memory Allocation Visualizer.

When configured to capture heap events and their associated stack events, ETW is a low-overhead means of capturing trace logs that the Memory Allocation Visualizer can use to construct the dynamic, interactive, customizable animated visualizations described herein. The heap events in these logs each contain details about the timestamp, allocation type, address, size, process id, thread id, heap handle, and source. Again, it should be understood, that in various embodiments, additional or custom memory events may also be defined so that pertinent memory event details will be captured by the ETL. Clearly, such information is often of significant interest to programmers while they are developing an understanding of the memory system behavior of their programs. It is also possible to visualize memory system events captured by other tracing infrastructures on other computing architectures by writing a simple adaptor to generate a trace that is similar to the one generated by ETW.

The basic visualization approach provided by the Memory Allocation Visualizer is to show the entire range of allocated memory addresses in a two-dimensional display map. However, as discussed in further detail below, various embodiments of the Memory Allocation Visualizer provide the user with the capability to "zoom" into, or otherwise expand, particular memory ranges or regions. Memory blocks are color coded (or shaded) to represent particular properties of each block, and the display is animated to show changes in allocation events over time. This animated display of the memory map supports user-interactive exploration of dynamic memory system behavior. In various embodiments, the Memory Allocation Visualizer also provides for generation of a statistical summary of allocation information at any specific point in time.

Note that the time scale used for animation playback does not have to be 1:1 with the time of program execution, and that playback speed is user adjustable in various embodiments. As noted above, the animation allows the user to understand changes over time, and can be used to discover a variety of memory problems, such as, for example, memory allocation churn problems. For example, if the animation constructed by the Memory Allocation Visualizer shows a particular block of memory repeatedly alternating between an allocated state (color coded red in a tested embodiment) and a freed state (color coded blue in a tested embodiment), this represents a potential case of memory churning that should be investigated. Note that in various embodiments, the particular color codings and/or shading styles used to represent particular memory events are user selectable and/or user definable.

Note also that while various display options can be used to display contiguous memory ranges, in various tested embodiments, the Memory Allocation Visualizer shows a linear address range of memory in a 2D display map. The linear range of memory is wrapped repeatedly to the next line (similar to the way a typical word processor wraps text to the next line as the length of the text line exceeds the margins of the page). More specifically, the upper-left corner of the memory display map represents the smallest address, and the lower-right corner represents the largest address, with memory events being wrapped to the next line, as needed, in address order. Note that this wrapping arrangement also supports widow resizing such that the wrapping will change as the width of the display window is increased or decreased. Wrapping will also change as the zoom level is increased or decreased by the user.

Figure 2:
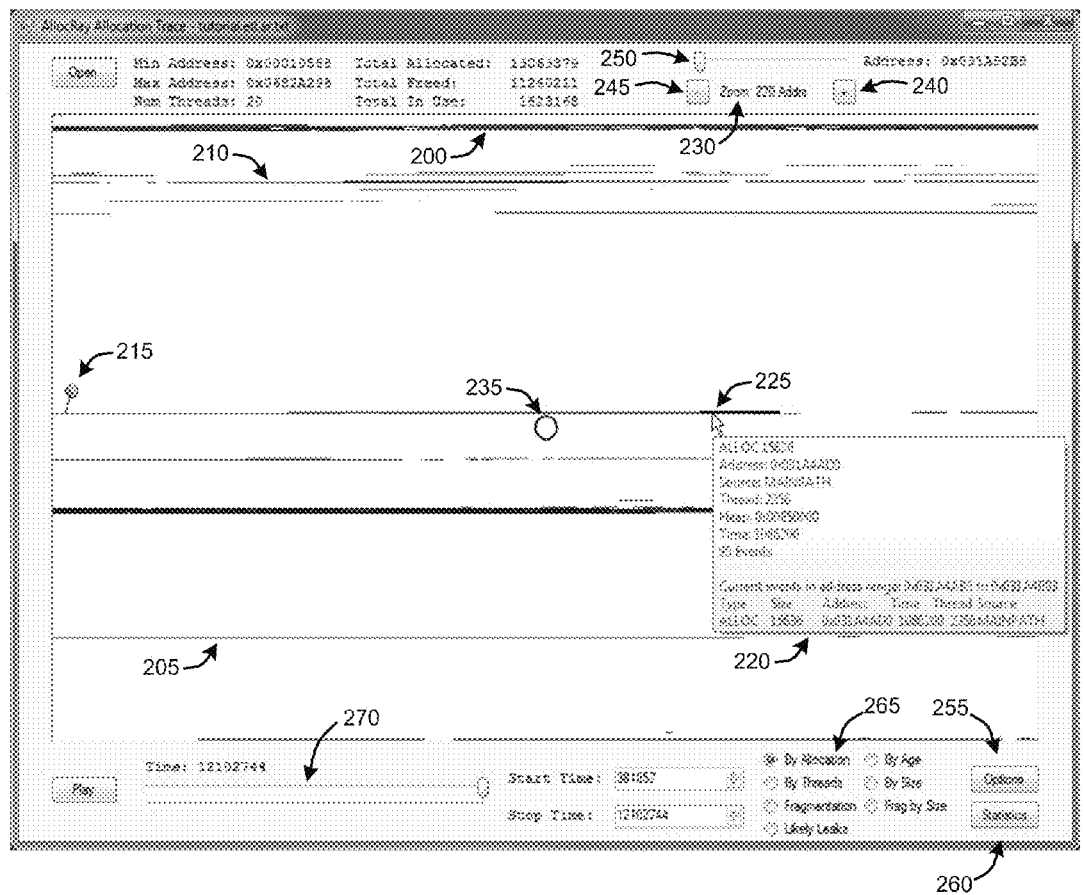
FIG. 2 provides an exemplary screen image captured from a working embodiment of the Memory Allocation Visualizer that illustrates an example trace during animated playback of recorded memory events.

FIG. 2 provides an exemplary screen image captured from a working embodiment of the Memory Allocation Visualizer that illustrates an example trace at the end of an animated playback of recorded memory events. Each pixel in the display map of the memory trace represents a range of memory addresses. Consequently, the term "pixel event" is used herein to describe memory events represented by particular pixels. For example, a "fragmentation pixel event" refers to a display of pixels corresponding to memory fragmentation events at some memory address or address range.

The example in FIG. 2 shows various types of allocation events animated over time (with the total time period of the program execution illustrated via an elapsed time display, a time bar, a user adjustable slider or the like, or any combination thereof, see, for example, element 270). Note that the displayed types are either all types of allocation events, or a subset of user identified or selected allocation types (since the viewing mode selected for this animation is by allocation). More specifically, FIG. 2 provides an allocation trace by allocation. See the lower right corner where a set of user selectable radio buttons 265 allows the user to select the view to be used for the animation. Note that other trace formats or "viewing modes" are available, and will be described in further detail in Section 2.3.

More specifically, in the example provided by FIG. 2, Alloc events (200) are shown in red, Realloc events (205) are shown green, and Free events (210) are shown in blue. The pin 215 (center left of FIG. 2) represents an annotation to a particular event provided by the user. Note that it should be understood that the user can mark particular memory locations using some sort of graphic (such as the pin 215), but that any type of graphic can be used for such markings. A tooltip 220 is shown for an event, which is highlighted in black, as the result of user identification or selection (see pointer 225) via either a hover action or specific selection, right click for context menu, etc. In a tested embodiment, the graphic representing an annotation (e.g., pin 215) is automatically placed at the starting memory address of the selected event. However, annotations may also be placed wherever desired within the overall animation.

In the example in FIG. 2, notice in the upper right that each pixel represents 220 addresses at the current zoom level 230. The circle 235 in the middle of the screen is highlighting the user's current selected pixel. Note, however, that any desired shape, shading, or color combination can be used to highlight the currently selected pixel in various embodiments of the Memory Allocation Visualizer. If the user clicks elsewhere, that circle 235 moves to the new selected pixel. Zooming is done around the current selected pixel, and allows the user to better see additional details. The user can zoom in either with the mouse wheel, with the "+" and "−" buttons (240, 245), or with a zoom slider 250. In a tested embodiment, one click of the "+" button will zoom in so that each pixel represents half of the previous address range (e.g., 220 addresses in this example). However, the granularity of each zoom level can be set to any desired value. In an alternative tested embodiment, the granularity of each zoom level is a power of two, ranging from 1 address per pixel to 4096 addresses per pixel. In that embodiment, each row of the display map is 64-byte aligned when viewed in a power of two zoom factor, allowing for viewing of allocations on memory cache or page block boundaries.

Depending upon the level of zoom, each pixel typically represents many memory addresses (i.e., some contiguous range of memory address). Consequently, there may be more than one event per pixel. Yet, only one event can be shown at each pixel (via color coding) at any particular time. Therefore, the Memory Allocation Visualizer uses a variety of pixel event selection algorithms to determine what event will be represented by any given pixel at any given time (when more than one address is represented by each pixel). The most basic algorithm simply chooses the most recent event. This is generally appropriate when colors represent some property of the event, as the user generally wants the animation to show the most recent behavior at any point in time. However, for fragmentation and leak detection, the most recent event is not generally considered to be the correct choice. In particular, for fragmentation, the correct choice is any event that is a potential fragmentation event, so that all fragments are visible. Similarly, for leak detection, the correct choice is the event that is the most likely leak. As such, depending upon the selected view mode, the Memory Allocation Visualizer will use a different algorithm to select the proper color coding of each particular pixel. Note that additional details regarding these concepts are discussed below in the sections on fragmentation and leak detection.

Figure 5:
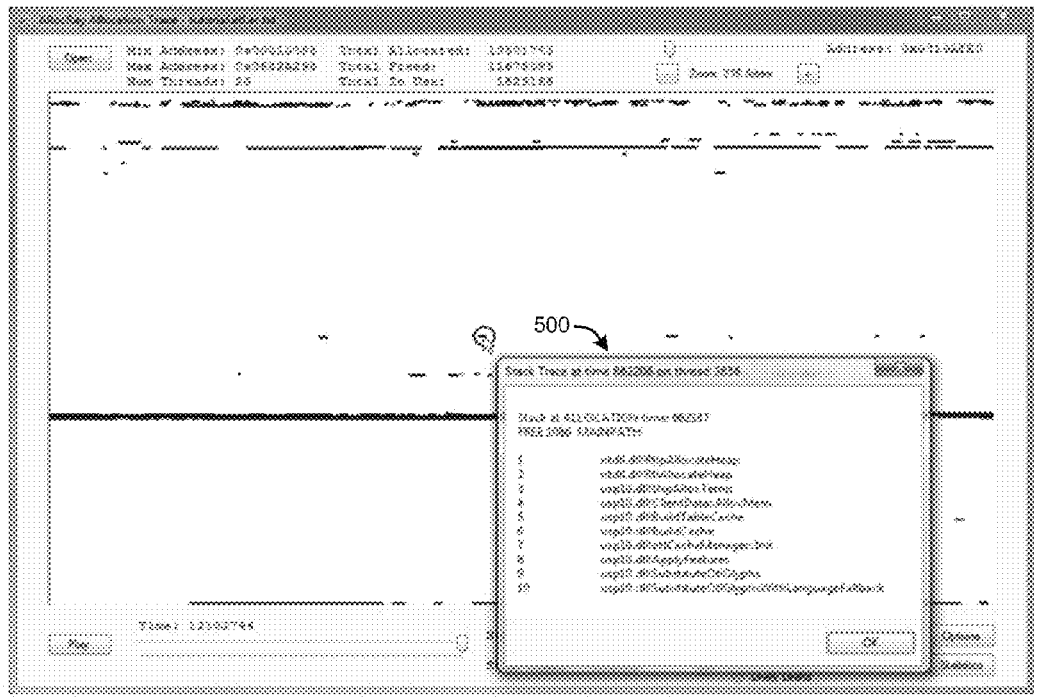
FIG. 5 provides an exemplary screen image captured from a working embodiment of the Memory Allocation Visualizer that illustrates a popup window showing a stack trace for user selected memory address during animated playback of recorded memory events.

As noted above, when the user hovers over a colored pixel, the event selected for that pixel is highlighted in black and a tooltip 220 shows the details of that event along with the number of events that have taken place at that address and a summary of the other events at that pixel, as shown in FIG. 2. This gives the user a quick way of assessing what is being displayed. When the user double-clicks on a colored pixel, the call stack 500 associated with the selected event is shown, as illustrated by FIG. 5, discussed in further detail below. This is a useful feature as it enables the user to determine where to look in the code for further analysis of potential problems. When the user right-clicks, a context menu 600 (e.g., see FIG. 6, discussed in further detail below) provides quick ways of setting filters for the source, heap, thread id, etc. of that event. It also allows the user to set a break point or pause on an address. During animation playback, when any of these pause addresses are encountered, the animation is paused so that the user can examine the state at that point in time. In addition, the context menu allows the user to see the details of the history of events for the selected address, to see the details of other events for this pixel, to show the call stack, and to add or edit an annotation for the event.

Figure 3:
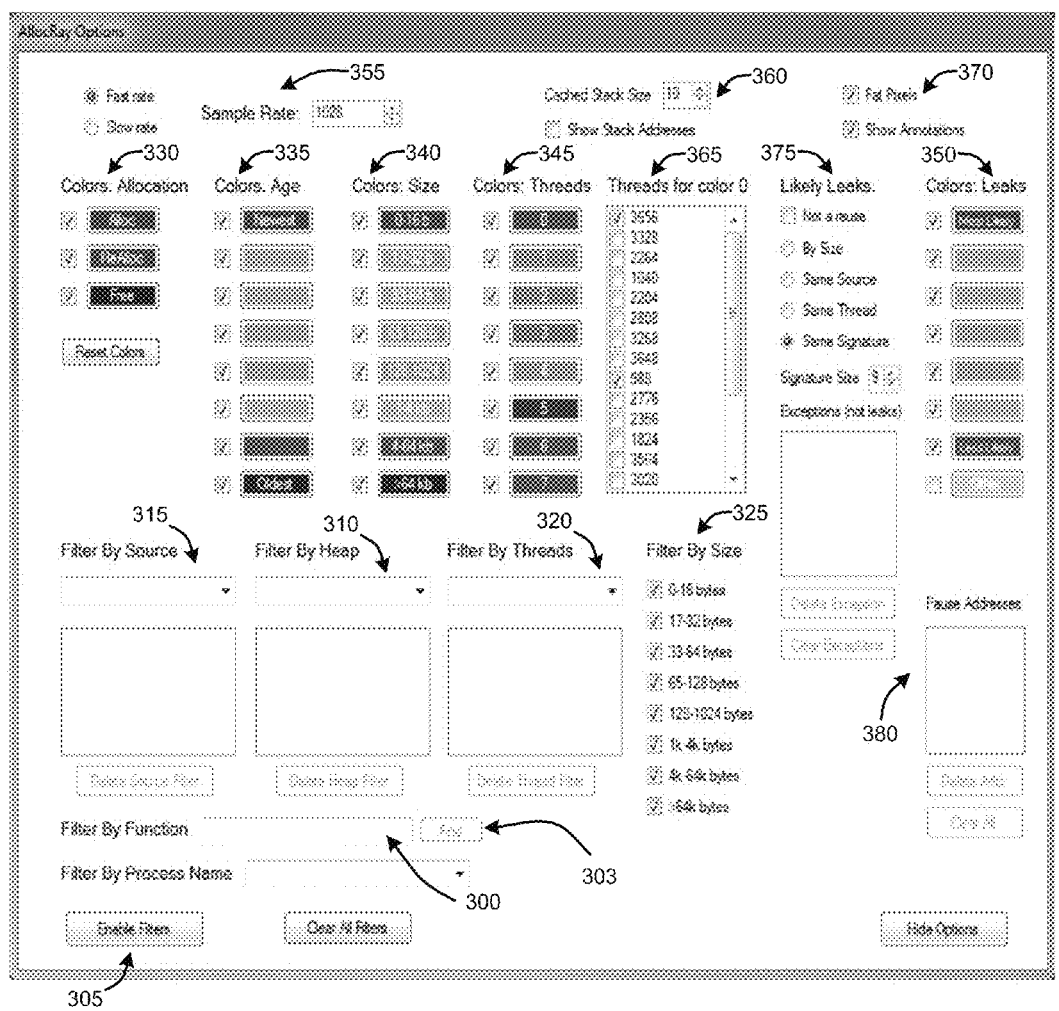
FIG. 3 provides an exemplary screen image captured from a working embodiment of the Memory Allocation Visualizer that illustrates an Options dialog window for identifying, specifying or selecting one or more user selectable options.
Figure 4:
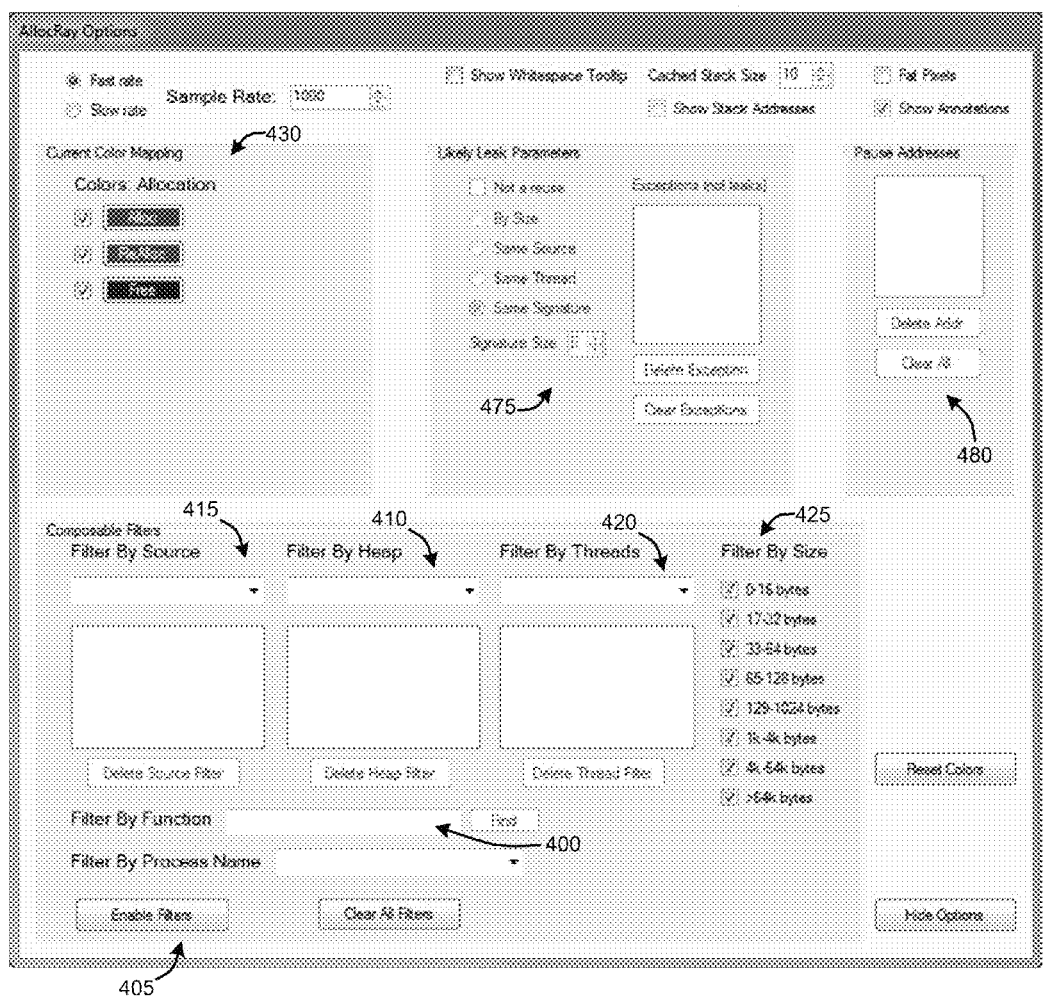
FIG. 4 provides an exemplary screen image captured from a working embodiment of the Memory Allocation Visualizer that illustrates an Options dialog window for identifying, specifying or selecting one or more user selectable options.

Referring back to FIG. 2, in the lower right of FIG. 2, there is an Options button 255. Clicking on that button will bring up an Options dialog box (see alternate embodiments of Options dialog as shown in FIG. 3 and FIG. 4, discussed in further detail in Section 2.2). As discussed in further detail below, there are generally three major parts to the Options dialog box: 1) a region for defining or selecting color mappings and which colors are visible; 2) a region for defining or selecting a set of one or more filters; and 3) a region for defining or selecting memory leak detector parameters.

Referring back to FIG. 2, as the user analyzes a trace, it is useful to be able to record observations for later use (or for use by another programmer on the team). This is done with the aforementioned annotation mechanism. Any event can be annotated by right-clicking on a memory block and adding, editing, or deleting an annotation. FIG. 2 shows one annotation, which appears as a pin 215 in the middle left of the display. The annotation will only be visible when that memory block is visible. That is, it will not be visible during the animation until that memory block is allocated, and then only if the visualization view (based on viewing mode and filters) makes the block visible.

The Statistics button 260 at the bottom right of FIG. 2 generates a snapshot analysis of memory allocations up to the point in time of the animation playback that the button is pressed. Once the statistics button 260 is pressed or selected, one or more spreadsheets or tables are then generated to allow for more detailed understanding of events. For example, one table shows event counts versus size, which includes the number of fragments and percentage of fragments for each size. A second table shows amount of memory in use for each size group. A third table shows the history of total size of allocations, number of fragments, and size of fragments at each time step. Finally, a fourth table shows total allocations for each thread for each size group. Note also that additional table or spreadsheet types can also be defined to provide the user with whatever additional information is desired.

2.2 Composable Filters

Examples of composable filters include: heaps, threads, source tag (e.g., MainPath, LowFrag, etc.), size, functions on call stack (note that function names are generally specific to each program), and process names. The filters illustrated in the Options dialog shown in FIG. 3 allow the user to focus on specific heaps, threads, sources, allocation size, functions, or process names. For example, to locate particular function names, the user presses a "Find" button 303 after entering a case insensitive substring of the function name, then chooses a particular function name in dropdown list 300 and presses the Enable Filters button 305 (assuming that one or more function names were returned in response to use of the Find button), only events that match the filter (i.e., only events associated with the specified function) will be shown. These filters are composable. The different filters are conjunctive, while multiple items in a particular filter are disjunctive. That is, if the user specifies several heaps in the heap filter 310, events from all of those heaps will be processed. If the user specifies a heap filter 310 and a function filter in the dropdown list 300, only events for the specified heap(s) and function will be processed. This gives the programmer a great deal of flexibility and control over what is displayed, and helps the programmer understand memory system behavior and isolate problem areas.

Other user selectable or adjustable filter options illustrated by the Options dialog of FIG. 3 include the capability to filter by source 315, filter by thread 320, and filter by size 325. Other user selectable options illustrated by the Options dialog of FIG. 3 include the capability to specify particular colors for allocation 330, age 335, size 340, threads 345, and leaks 350. Still further options illustrated by the Options dialog of FIG. 3 include the capability select sampling rates 355 for determining the number of events to process before re-rendering the display for each animation step, selecting a cache stack size 360, specifying colors for particular threads 365, etc. Note also that FIG. 3 illustrates a "Fat Pixels" selection option 370. The "Fat Pixels" selection option 370 uses larger pixels (i.e., a group of contiguous pixels, such as a 3×3 pixel region, for example) to represent each memory address or range of memory addresses. The result is that fewer memory addresses can be displayed at a particular zoom level. However, memory events will have an increased visibility (via their coloring) since the resulting "pixels" will be larger. The Options dialog of FIG. 3 also illustrates the capability to set various "likely leak" parameters 375, and pause addresses 380. Note that the specific arrangement of the Options dialog illustrated by FIG. 3 has no particular significance, and that the items illustrated in FIG. 3 can be placed in any desired arrangement or configuration, and that more or fewer user selectable options can be used to create the Options dialog, as desired.

In fact, an alternate implementation of the Options dialog is provided by FIG. 4 shows a simplified version of the Options dialog of FIG. 3. In particular, in the Options Dialog of FIG. 4, only the current color mapping 430 is shown, rather than all selectable color options as illustrated by elements 330 through 350 of FIG. 3. The composable filters (elements 400 through 425), leak parameters 475, and pause addresses 480 are similar to the corresponding features in FIG. 3, but have been delineated more clearly to improve the overall user experience.

2.3 Memory Behavior over Time by Attribute

Every heap event has certain attributes on which the user may focus to answer particular questions. These include allocation event code, age, size, and thread id. In each of these cases, the emphasis is on the animation of changes over time; hence pixel event selection uses the most recent event. For example, if focusing on size, the event chosen for a pixel is the most recent event for any address in that pixel's address range, and the pixel color will reflect the size of that event.

The following sub-Sections describe the various views (or color mappings) designed to discover particular kinds of memory allocation problems, specifically views by allocation, views by age, views by size, and views by threads. Note that as discussed in Section 2.1, the user selects the desired view with the radio buttons 265 in the lower-right part of FIG. 2. Note also that views for fragmentation and likely leaks are discussed in Sections 2.4 and 2.5, respectively.

2.3.1 "By Allocation" View Mode

A user will select the By Allocation view to get a general feel for use of memory allocation over time. In particular, this mode can be used to discover churn, where the same memory is allocated, freed, and allocated again repeatedly. It can also be used to easily discover if allocations are clustered or spread out over the entire address space. The default pixel coloring for allocations is shown on the upper left side of FIG. 3 (see element 330), with these colors being used to generate the aforementioned animation. Note that these colors can be changed by the user and that other default color settings can be used, if desired. In the example provided by FIG. 3, the color red is used for alloc events, green for realloc events, and blue for free events. The checkboxes next to each color allow the user to suppress or enable displaying a particular category. For example, realloc events happen relatively rarely and may be difficult to see without suppressing display of alloc and free events. The color mapping may be changed by the user by clicking on any of the color buttons, which brings up a color selector. The Reset Colors button will reset all colors and color checkboxes to their default values.

2.3.2 "By Age" View Mode

A user will select the By Age view to differentiate between transient and long-term memory allocation behavior in the animation of memory allocation recorded during program execution. There are eight colors used for age groupings, from red for newest to blue for oldest allocations. As is well known to those skilled in the art of human color perception, only a small number of colors can be perceived rapidly. In particular, typical estimates of the optimal number of colors vary from five to ten, hence the choice of eight, though more or fewer color choices can be presented, if desired. Note that this is the case with all of the different "views" described herein. As with allocation colors, these color assignments can be changed or suppressed by the user. Note that only memory blocks that are in active use are shown in the By Age view (i.e., free events are not visible).

2.3.3 "By Size" View Mode

Selecting the By Size view allows the user to see the distribution of allocations by different size groups in the animation of memory allocation recorded during program execution. This is important because it helps the programmer distinguish different program object types. Again, eight colors are used for different size categories, with red being used for the smallest and blue for the largest memory blocks allocated. As the most salient color, red is chosen for small memory blocks because they might otherwise be hard to see (often taking only one pixel). Again, the by size colors can be changed or suppressed by the user.

2.3.4 "By Threads" View Mode

Selecting the By Threads view allows the user to see how allocations are distributed across different threads in the animation of memory allocation recorded during program execution. Again, eight colors are used for groups of threads. However, in this case, since no one group would be considered prominent, the default color mapping uses equal saturation colors. Furthermore, the colors may be reassigned by the user, but they can be suppressed in this case.

Since the number of threads may be larger than eight, threads are grouped into eight sets. The assignment of threads to a particular set is shown in the center of the Options panel (see element 345 of FIG. 3). Clicking on a thread set's color button will show that set's thread assignments. In the default mapping, thread group 0 is the first thread encountered and every eighth thread afterwards. The user may reassign these mappings if desired. In various embodiments of the Memory Allocation Visualizer, more sophisticated assignments are also made available to the user, such as processor affinity or logical work based grouping (not shown as an option in FIG. 3). If the user wishes to see only the memory allocation pattern for one thread or a small number of threads, thread filtering is used (as discussed in further detail below).

2.4 Memory Fragmentation (Fragmentation and Frag Size Views)

Memory fragmentation is the failure to reuse memory that has been freed, and excessive fragmentation can lead to more costly paging. To help the user find potential memory fragmentation problems, the animation generated by the Memory Allocation Visualizer displays memory blocks that have been freed exactly one time and not reused in the fragmentation views (i.e., By Fragmentation view, and By Frag Size view).

Since the Memory Allocation Visualizer is only showing free events in the "By Fragmentation" view, this will look like a By Allocation view with the alloc and realloc events suppressed, so that only blue memory blocks appear. However, the By Allocation view uses the most recent event pixel event selection algorithm. As mentioned earlier, this is not correct for fragmentation, as it may choose something other than a potential fragmentation event for a pixel when one is available. This means that some potential fragmentation events will not be visible until the user zooms into a region. To address this issue, the Memory Allocation Visualizer uses a fragmentation pixel event selection algorithm that selects any potential fragmentation event over the latest event. With this approach, any potential fragmentation event will be visible even when fully zoomed out (as illustrated by FIG. 5).

A variant of the By Fragmentation view is fragmentation by size view, or the "By Frag Size" view. In this view, the pixel event selection is the same but the blue color coding is replaced by the size color coding described earlier for the By Size view. This view helps the user identify fragmentation problems for small allocations, which are probably the most serious of the fragmentation problems, because they have a higher likelihood of disrupting caching and paging performance.

FIG. 5 shows an example of potential memory fragmentation events from the same trace shown earlier. Note that this also illustrates fat pixels, a display mode that replaces each pixel with a 3×3 pixel rectangle designed to make small allocations visible (and easily selectable).

2.5 Memory Leaks (Likely Leaks View)

Figure 6:
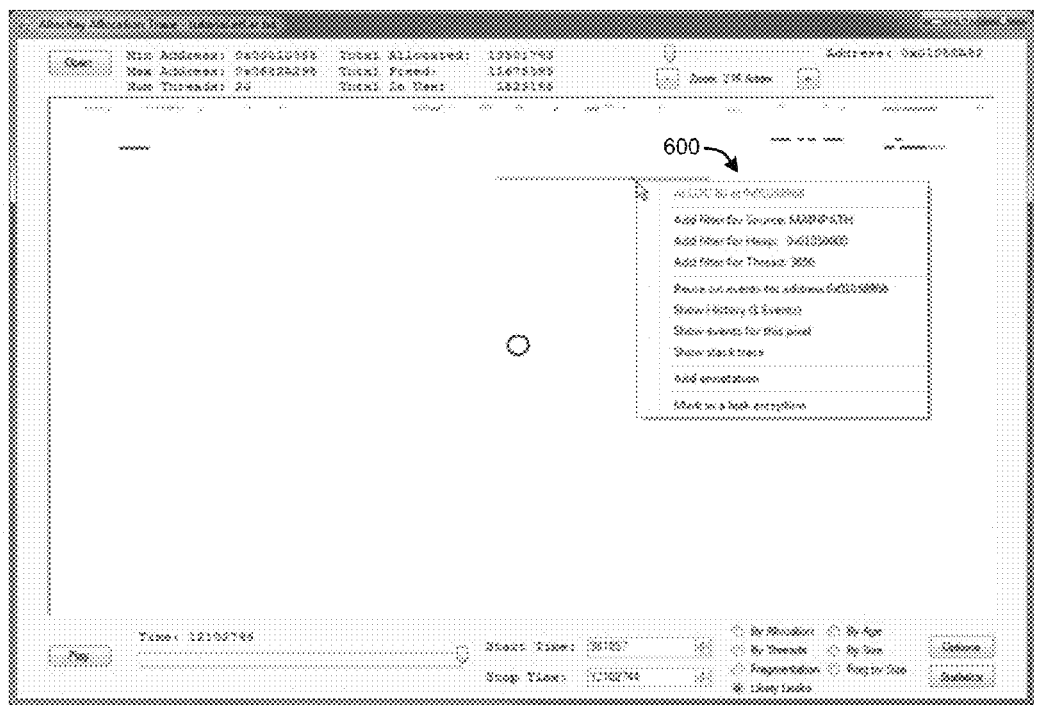
FIG. 6 provides an exemplary screen image captured from a working embodiment of the Memory Allocation Visualizer that illustrates a popup window showing a context sensitive window of available actions corresponding to a user selected memory address during animated playback of recorded memory events.

Memory leaks are the failure to free memory that is no longer in use, and can lead to running out of memory and poor paging behavior. In ideal circumstances, the event trace logs (ETLs) would contain both memory allocation events and memory use information. With that information, it can be seen when memory was still allocated, but no longer in use. However, retaining memory use information is far too expensive in terms of storage space, so the Memory Allocation Visualizer uses the allocation events instead. To help the user find likely leaks, the Memory Allocation Visualizer analyzes the oldest memory blocks still in use, looking for repeating allocation patterns (by stack signature, size, source, or thread). The rationale for this is that isolated (one time) leaks are less problematic in the long term than those that recur. Those events with repeating patterns are sorted by the number of repetitions and color coded in sort order, with red for the most likely leak (i.e., the potential leak with the most repetitions). FIG. 6 is an example of the same trace looking at the same stack signatures.

As with fragmentation, the most recent event pixel event selection algorithm is not correct for likely leaks. In this case, the Memory Allocation Visualizer automatically chooses the event that is the most likely leak, to ensure that the color coding of pixels is correct at all zoom levels. The Options dialog box shown in FIG. 3 has likely leak parameters in the upper right region. The "Not a reuse" checkbox in the likely leaks options section (see element 375) will optionally eliminate reused memory from consideration. The "By Size" radio button checkbox in the likely leaks options section (see element 375) treats all potential leaks as equally likely and color codes with the "Colors: Size" encoding. Since likelihood is measured by sorting by the number of repetitions of old allocations, a sorting step is used as the initial step of pixel event selection. In keeping with the earlier use of eight color codes, the top seven repetitions are color coded, and the eighth color code (grey) is for all remaining potential leaks (i.e., old allocations). Again, the user is free to specify or select other color options, if desired.

When analyzing for repetition in leak detection, looking for allocations from the same call site appears to be the most effective search technique based on known techniques. To measure this, a stack signature is computed by XOR'ing the hash of the top n (specified by the "Signature Size" box) call stack module and function names.

During analysis, it is expected that the user will examine the likely leaks to determine whether each call site is actually the source of a leak. The tooltip in this view contains additional information about the number of repetitions. If the user determines that an event is not the source of leaks, the user can mark it (with the context menu) as an exception. The list of exceptions is shown in the likely leaks options section of the Options dialog box (see element 375), hovering over that box will show the call stack for the selected exception's call signature. Any leak exceptions are removed from consideration as likely leaks and the likely leak view is updated accordingly.

2.6 Implementation Details

Trace logs (i.e., the ETL) are typically quite large (e.g., hundreds of megabytes to several gigabytes) and may contain millions of heap events. The visualization should be able to display the history of these events in a fairly short period of time (e.g., ten seconds). Additionally, most user interaction should be as fast as possible to provide an acceptable user experience.

For example, changing the view between By Allocation, By Size, By Age, By Threads, Fragmentation, Fragmentation by Size, and Likely Leaks should be very fast. Zooming in and out, changing filters, changing color assignments or visibility, and changing the characteristics of leak detection should also be very fast to provide an acceptable user experience. For example, in a tested embodiment of the Memory Allocation Visualizer, one study trace was about 700 megabytes with 1.7 million events. The time to switch between views was observed to be about one-half second. The following paragraphs describes various data structures and techniques used to enable processing of an enormous number of trace events while enabling rapid respond to visualization view changes initiated by the user during playback of the animation.

2.6.1 Animation Playback Rate

Processing individual trace events is fast compared to the time it takes to render the memory map display. Hence, during animation playback, a sampling rate (see element 355 of FIG. 3) is used to determine the number of events to process before re-rendering the display for each animation step. From a design perspective, the user would ideally choose between two playback speeds: fast (e.g., about 10 seconds) and slow (perhaps 30 seconds). The slower rate would only be used when the user needs a better understanding of the changes taking place during part of the trace. However, it should be understood that any desired playback speed can be provided to the user in various embodiments of the Memory Allocation Visualizer.

In a tested embodiment of the Memory Allocation Visualizer, this is done by computing a sampling rate from the total number of events and the target time. This appears to be adequate for most cases. The time it takes to render the display depends on a number of factors, including how much of the map is colored (which depends on the view mode, the size of the allocated memory blocks, and the number of allocated blocks) and whether "fat pixels" are displayed. To control the animation speed correctly, an adaptive sampling rate may be used. In particular, in one embodiment of the Memory Allocation Visualizer starts with the estimated sampling rate that is currently used, and changes the rate during the animation to respond to the actual time being taken on each animation step.

2.6.2 Primary Data Structures

The following are the primary data structures maintained to enable rapid visualization view changes, while also enabling animated playback of a large number of events. Note that the names assigned to each data structure (e.g., "EventArray," "MemoryUseDictionary," etc.) are provided only for purposes of explanation with respect to the structure and function of the data structures described below.

EventArray: The "EventArray" is an array of "MemEvent" objects, each of which contains the basic information derived from a corresponding event in the ETL, including the event type, address, size, source, thread id, process id, stack signature, saved partial call stack, and time stamp. The array is accessed by an event index, which is used in other data structures to represent the event.

MemoryUseDictionary: The "MemoryUseDictionary" is a dictionary that maps from addresses to "MemUse" objects, which contain a history of all events for a given address up to the current time. This dictionary is used for the following purposes:

1) to determine if an event is a potential fragmentation event or if the address has been reused (for leak analysis);

2) to find the stack associated with the most recent alloc or realloc event when the user asks to see the stack at a free event;

3) to provide the user with the history of events when needed.

This dictionary enables rapid changes of visualization views; it is scanned during a view change to find the latest event for each address. Without this data structure, it would be necessary to rescan the ETL for stack information and replay the animation to change filters.

PixelList: The "PixelList" is another dictionary that, in this case, maps from pixel number to event index. It is populated using the current pixel selection algorithm described previously. It is constructed either incrementally during animation playback or directly from the MemoryUseDictionary during a view change.

RecentPixelList and RecentPixelColorList: The "RecentPixelList" is a dictionary that maps from pixel number to event index, and contains only pixels that are currently being displayed. The "RecentPixelColorList" is a dictionary that maps from pixel number to color. These two dictionaries are populated by scanning the PixelList, and selecting only pixels that should be visible for the current view and filter set. For example, in the fragmentation view, only free events are visible. Normally, the color is chosen by the current view and the current color assignment for that view. If age is being shown, the current age is computed and the appropriate age color is chosen. The re-rendering of the display (at an animation step or visualization view change) is driven directly from RecentPixelList and RecentPixelColorList.

The size of the EventArray is proportional to the number of log events. The size of the MemoryUseDictionary is proportional to the number of addresses for which events occur. Hence, if there is less memory reuse in the trace, the MemoryUseDictionary will be larger; however, the number of elements will be less than the number of elements in the EventArray. The number of elements in the PixelList is the number of pixels for which an event is potentially shown. This is generally many fewer than the total number of pixels in the display map. The number of elements in the RecentPixelList and RecentPixelColorList is the number of pixels for which an event is shown (i.e., that is not filtered).

2.6.3 Pixel Event Selection

As mentioned earlier, pixel event selection for memory fragmentation and likely leaks is more complex than simply selecting the most recent event. As a further complication to the implementation of fragmentation detection, consider what happens during animation playback when a potential memory fragment is reused. It is no longer a potential memory fragment, so it is removed from the display. For a memory block that takes multiple pixels, the first and last pixel of the range are then examined to find any other potential fragmentation event to take the place of the one being removed.

The likely leaks view has a similar implementation complication. During animation playback, if an old allocation is freed, it is no longer a potential leak, so is removed from the display. For a memory block that takes multiple pixels, the first and last pixel of the range are again examined to find the most likely leak event to take the place of the one being removed. Note that this also requires a sorting by number of repetitions in order to determine which event is the most likely leak and ensure that the color coding for the pixel is correct.

2.6.4 Examples of Data Structure Use for Animation Generation

FIGS. 7 through 14 illustrate use the data structures described in Section 2.6.2 in a series of flow charts that show operation of various features of the Memory Allocation Visualizer.

Figure 7:
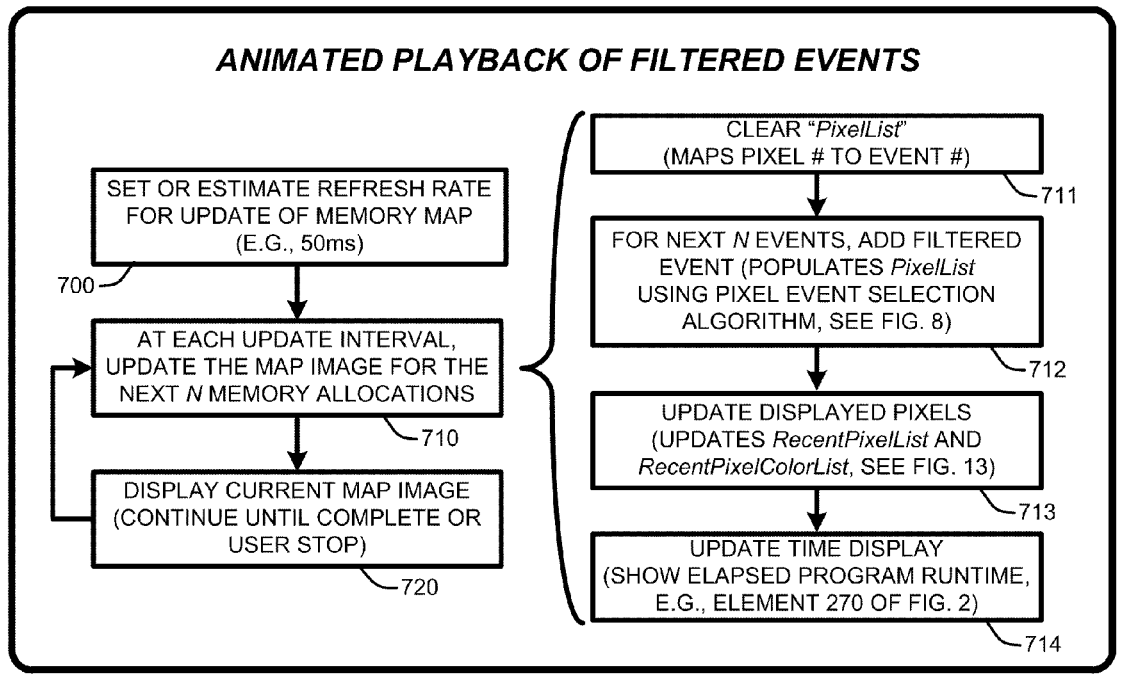
FIG. 7 provides a general system flow diagram that illustrates exemplary methods for implementing animated playback of filtered events, as described herein.

For example, FIG. 7 provides a general system flow diagram that illustrates exemplary methods for implementing animated playback of filtered events. More specifically, animated playback of filtered events begins by setting or estimating 700 the refresh rate for updating the memory map (i.e., the trace displayed in the animation, such as illustrated in FIG. 2). In a tested embodiment, refresh times on the order of about 50 ms were observed to provide acceptable animation results. Once the update rate has been set or estimated 700, the animation is then updated 710 once each time that the update interval is reached (e.g., updates to the animation once every 50 ms). In other words, at each update interval, the Memory Allocation Visualizer updates 710 the map image for the next n memory allocations, then continues to display 720 the current map image until the entire display (over the recorded time period) is complete or the user stops playback.

Figure 14:
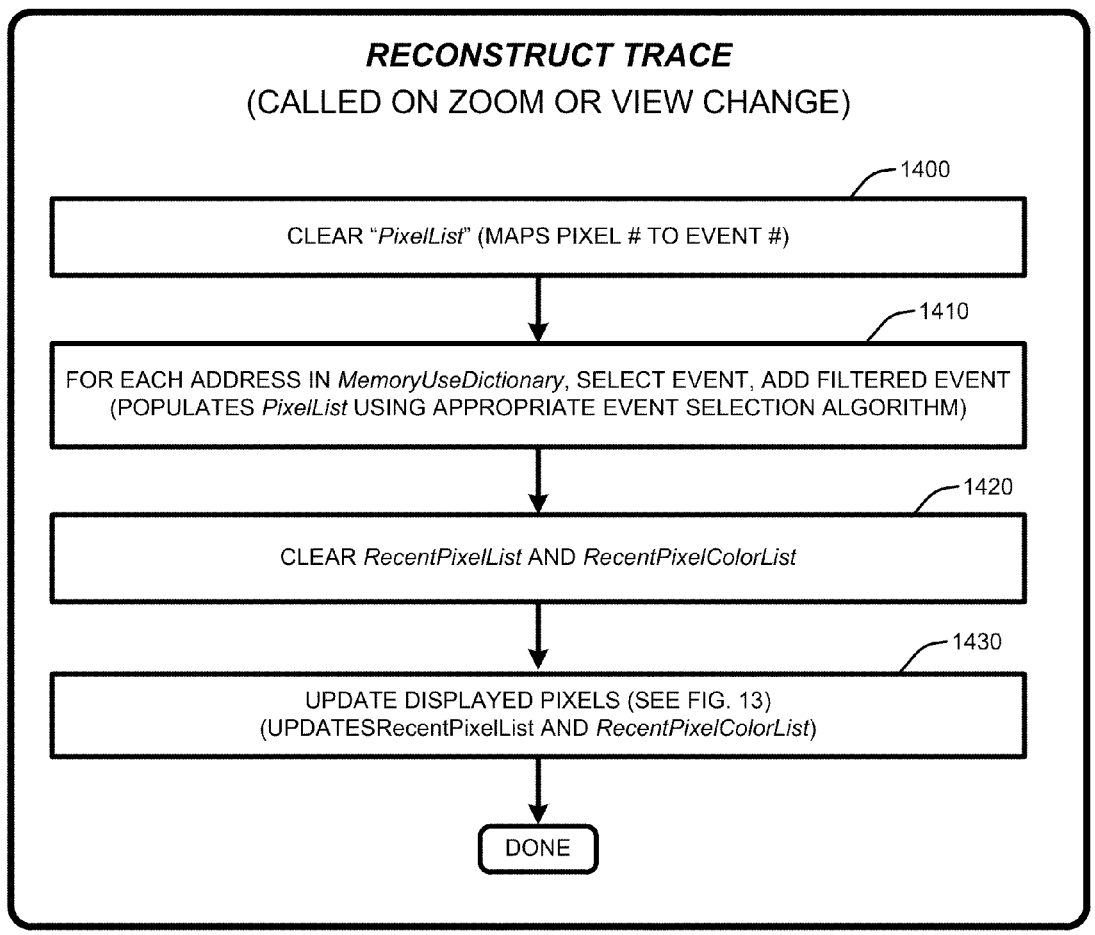
FIG. 14 illustrates a general system flow diagram that illustrates exemplary methods for reconstructing a memory map trace displayed during animated playback of filtered events in response to a user initiated zoom or view mode change, as described herein.

Note that the process provided by element 710 of FIG. 7 is expanded as illustrated by elements 711 through 714 of FIG. 7. More specifically, the processes of element 710 begin operation by clearing 711 the aforementioned PixelList, which, as described above, maps pixel numbers displayed in the animation to event numbers (i.e., an event index). Next, as illustrated by element 712 of FIG. 7, for the next N events, filtered events are added by populating the PixelList using one of the aforementioned event selection algorithms. Note that the processes of element 712 for adding filter events are further illustrated by FIG. 8, as discussed in further detail below. Next, continuing with element 713 of FIG. 7, the Memory Allocation Visualizer next updates the displayed pixels by updating the RecentPixelList and the RecentPixelColorList. Note that the processes of element 713 for updating displayed pixels are further illustrated by FIG. 13, as discussed in further detail below. Finally, as illustrated by FIG. 14, the Memory Allocation Visualizer updates a time display (e.g., element 270 of FIG. 2) to show where the current animation is in terms of the overall playback time.

As noted above, FIG. 8 expands on element 712 of FIG. 7 by providing a general system flow diagram that illustrates exemplary methods for implementing addition of filter events to an animated playback of filtered events. More specifically, the Memory Allocation Visualizer adds filter events to the animation by first determining 800 whether an event at the current memory address is filtered via one of the aforementioned composable filters. If it is not filtered, the then Memory Allocation Visualizer performs a pixel event selection 810 which adds the filtered event to the PixelList data structure based on the currently selected animation view mode. Note that the processes of element 810 for pixel event selection are further illustrated by FIG. 9, as discussed in further detail below.

Referring back to FIG. 8, once the pixel event selection 810 has been completed, the Memory Allocation Visualizer updates 820 any corresponding statistics. Next, a determination 830 is made as to whether the filtered event is a realloc event with a smaller size. Note also that this same determination is made for the event at the current memory address is determined 800 to not be filtered via one of the aforementioned composable filters. If the filtered event is not a realloc event with a smaller size, then the add filter process illustrated by FIG. 8 terminates. However, if the filtered event is a realloc event with a smaller size, the Memory Allocation Visualizer acts to free up 840 the remainder of older allocations in the PixelList data structure prior to termination of the add filter process illustrated by FIG. 8.

Figure 8:
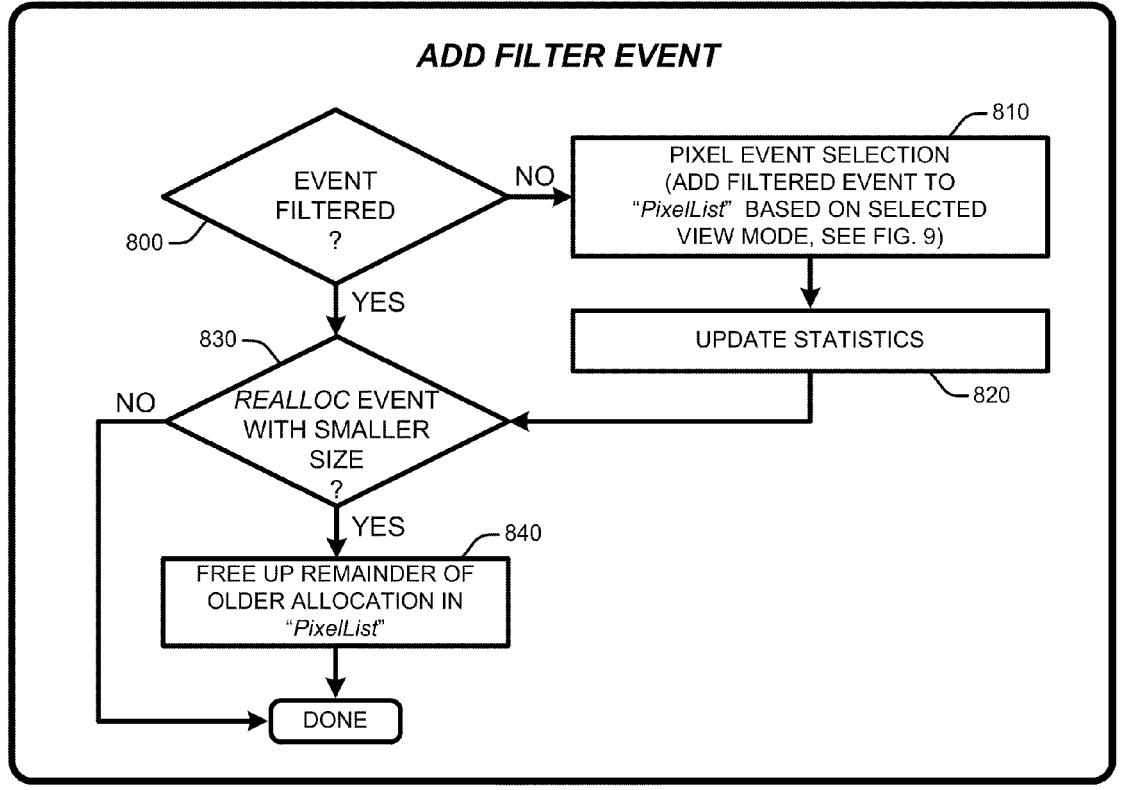
FIG. 8 provides a general system flow diagram that illustrates exemplary methods for implementing addition of filter events to an animated playback of filtered events, as described herein.

As noted above, FIG. 9 expands on element 810 of FIG. 8 by providing a general system flow diagram that illustrates exemplary methods for implementing general pixel event selection during animated playback of filtered events. More specifically, the Memory Allocation Visualizer performs the aforementioned pixel selection process by first determining 900 whether the selected view mode is a fragmentation view. If the current view is a fragmentation view, the Memory Allocation Visualizer performs fragmentation pixel event selection, as illustrated by element 910 of FIG. 9, to show any fragment, at which point this process terminates. Note that the processes of element 910 for fragmentation pixel event selection are further illustrated by FIG. 11, as discussed in further detail below.

Referring back to FIG. 9, in the case that the determination 900 shows that the selected view mode is not a fragmentation view the Memory Allocation Visualizer determines 930 whether the current view mode is a likely leaks view. If the selected view mode is a likely leaks view, then the Memory Allocation Visualizer performs leak pixel event selection, as illustrated by element 920 of FIG. 9, to show the most likely leak, at which point this process terminates. Note that the processes of element 920 for leak pixel event selection are further illustrated by FIG. 12, as discussed in further detail below. Referring back to FIG. 9, in the case that the determination 930 shows that the selected view mode is not a likely leaks view the Memory Allocation Visualizer performs normal pixel event selection, as illustrated by element 940 of FIG. 9. Note that the processes of element 940 for normal pixel event selection are further illustrated by FIG. 10, as discussed in further detail below.

Figure 9:
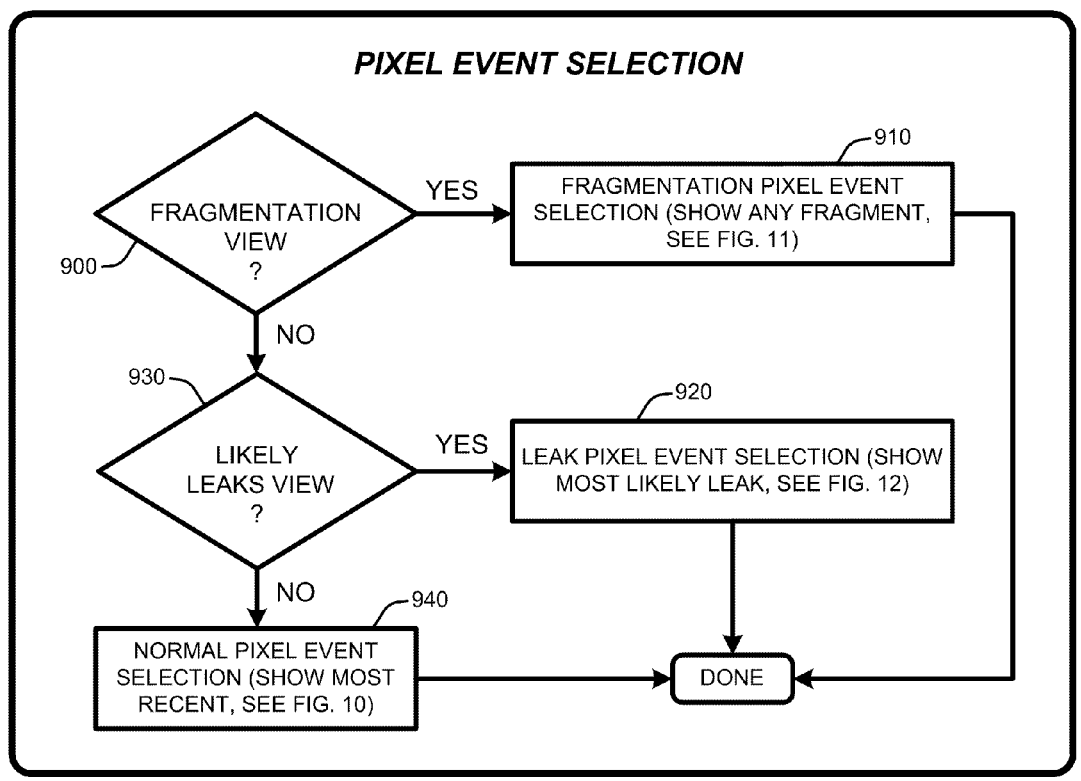
FIG. 9 provides a general system flow diagram that illustrates exemplary methods for implementing general pixel event identification or selection during animated playback of filtered events, as described herein.

As noted above, FIG. 10 expands on element 940 of FIG. 9 by providing a general system flow diagram that illustrates exemplary methods for implementing normal pixel event selection during animated playback of filtered events. In particular, this process begins with a determination 1000 of whether there is an event at the current pixel at the current time. If there is no event at the current pixel, the Memory Allocation Visualizer assigns 1010 an event to that pixel. The Memory Allocation Visualizer then increments to the next pixel 1040 and, so long as that next pixel is not the last pixel 1050, the determination of whether that next pixel has an event is repeated 1000, with the subsequent steps, as described above, also being repeated. If that next pixel is the last pixel for the event, then the process illustrated by FIG. 10 terminates.

In the case that the determination 1000 shows that there is an event at the current pixel, the Memory Allocation Visualizer then determines 1020 whether the event is later. If the event is later, then the Memory Allocation Visualizer assigns 1030 that event to that pixel. The Memory Allocation Visualizer then increments to the next pixel 1040 and, so long as that next pixel is not the last pixel 1050, the determination of whether that next pixel has an event is repeated 1000, with the subsequent steps, as described above, also being repeated. If that next pixel is the last pixel for the event, then the process illustrated by FIG. 10 terminates.

Figure 10:
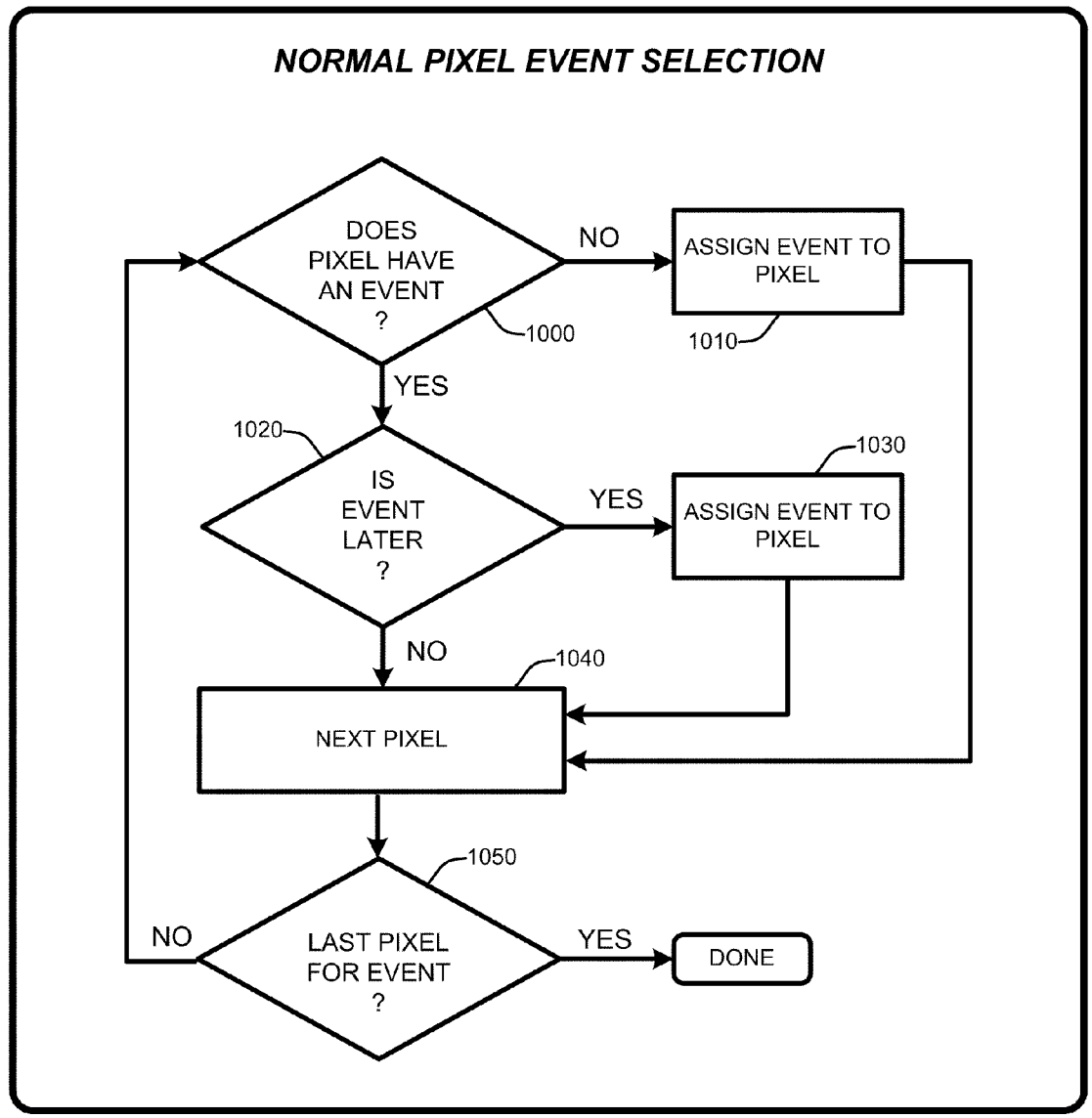
FIG. 10 provides a general system flow diagram that illustrates exemplary methods for implementing normal pixel event identification or selection during animated playback of filtered events, as described herein.
Figure 11:
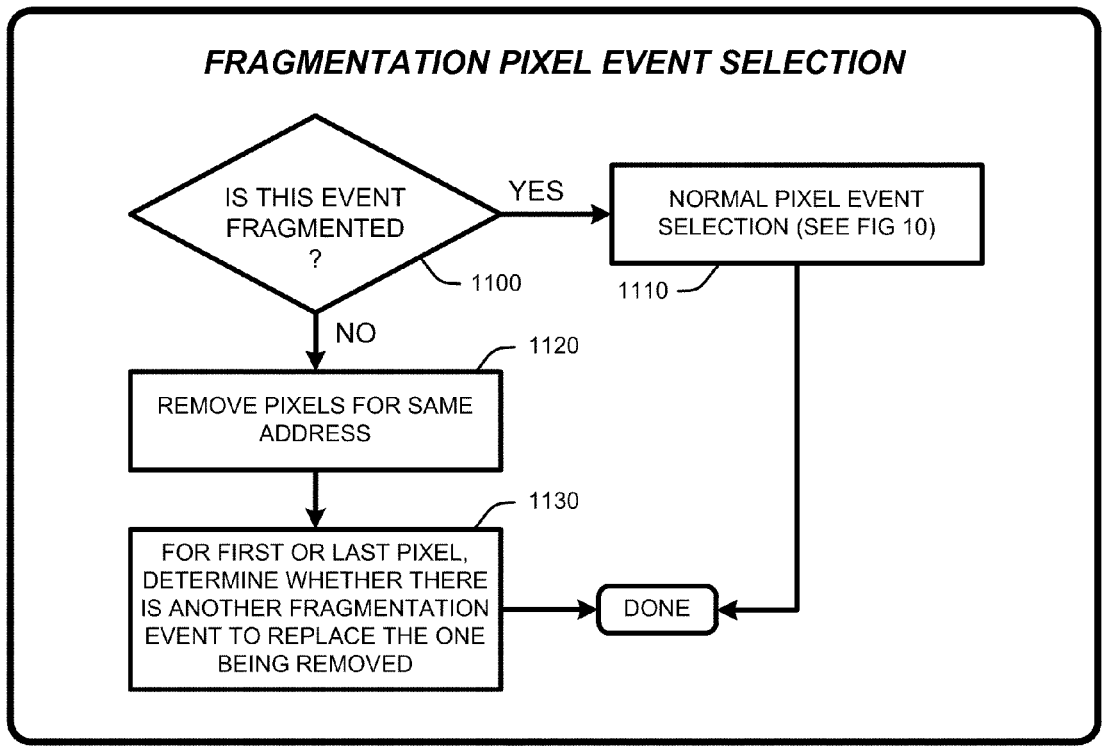
FIG. 11 provides a general system flow diagram that illustrates exemplary methods for implementing fragmentation pixel event identification or selection during animated playback of filtered events, as described herein.
Figure 12:
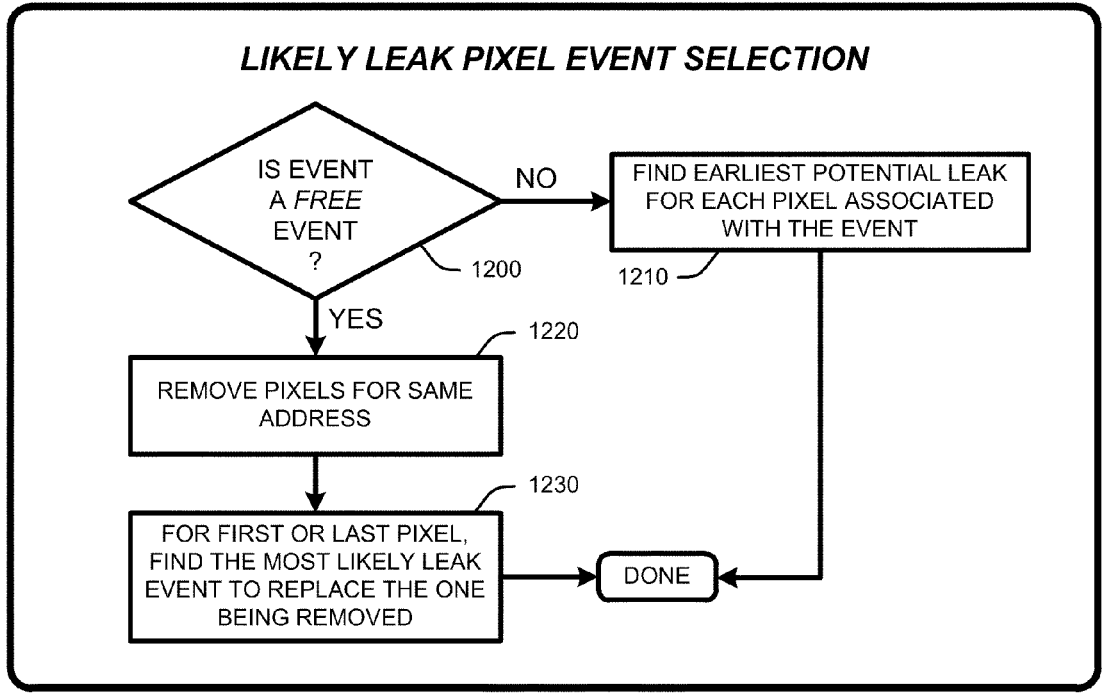
FIG. 12 provides a general system flow diagram that illustrates exemplary methods for implementing likely leak pixel event identification or selection during animated playback of filtered events, as described herein.
Figure 13:
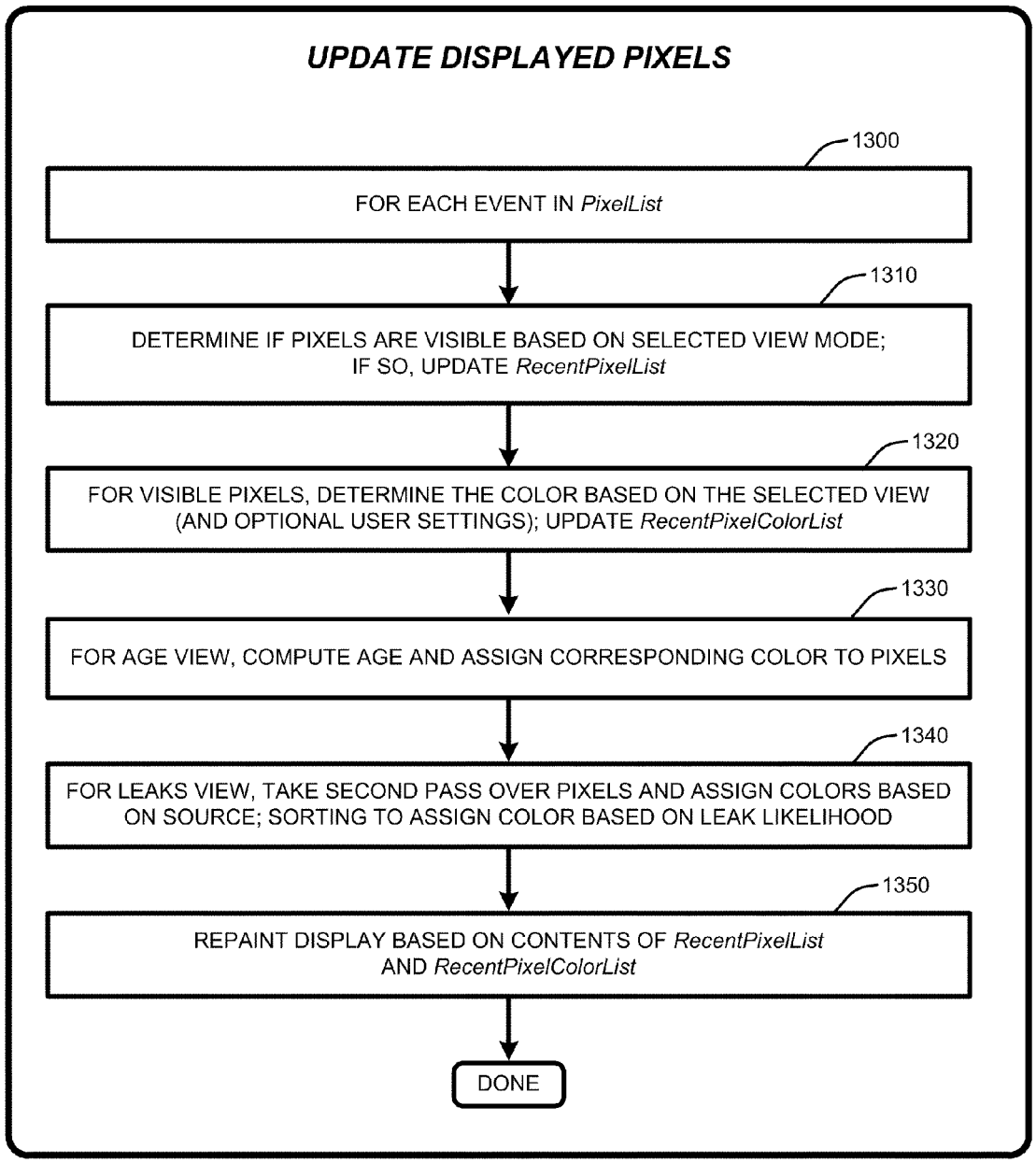
FIG. 13 provides a general system flow diagram that illustrates exemplary methods for implementing updates to displayed pixels during animated playback of filtered events, as described herein.

As noted above, FIG. 11 expands on element 910 of FIG. 9 by providing a general system flow diagram that illustrates exemplary methods for implementing fragmentation pixel event selection during animated playback of filtered events. In particular, this process begins by determining 1100 whether the current event is fragmented. If the event is fragmented, then the Memory Allocation Visualizer performs normal pixel event selection 1110 as illustrated by FIG. 10, at which point this process terminates. However, if the determination 1100 indicates that the current event is not fragmented, the Memory Allocation Visualizer removes 1120 the pixels for the same address from the trace map. Then, as illustrated by element 1130, for the first or last pixel, the Memory Allocation Visualizer determines whether there is another fragmentation event to replace the one being removed. If such event exists, then it is added to the map display, at which point the process illustrated by FIG. 11 terminates.

As noted above, FIG. 12 expands on element 920 of FIG. 9 by providing a general system flow diagram that illustrates exemplary methods for implementing likely leak pixel event selection during animated playback of filtered events. In particular, this process begins by is a free event. If the event is not a free event, then the Memory Allocation Visualizer acts to find 1210 the earliest potential leak for each pixel associated with the event, at which point this process terminates. However, if the determination 1200 indicates that the current event is a free event, the Memory Allocation Visualizer removes 1220 the pixels for the same address from the trace map. Then, as illustrated by element 1230, for the first or last pixel, the Memory Allocation Visualizer finds (i.e., identifies) the most likely leak event to replace the one being removed, at which point the process illustrated by FIG. 12 terminates.

As noted above, FIG. 13 expands on element 713 of FIG. 7 by providing a general system flow diagram that illustrates exemplary methods for implementing updates to displayed pixels during animated playback of filtered events. In particular, this process begins by examining the PixelList data structure, and for each event 1300 in the PixelList determining 1310 if the corresponding pixels are visible based on the currently selected view mode. If the pixels are visible, then the Memory Allocation Visualizer updates the RecentPixelList data structure described above.

Next, for visible pixels, the Memory Allocation Visualizer determines 1320 the pixel color, based on the currently selected view mode and any optional user settings, and continues by updating the RecentPixelColorList data structure with the just determined pixel colors.

Next, for age views, the Memory Allocation Visualizer computes the current age (as discussed above) and assigns 1330 a corresponding color to the pixels. For leak views, the Memory Allocation Visualizer then takes a second pass over the pixels and assigns 1340 colors to each pixel based on source, as discussed above. The Memory Allocation Visualizer also sorts the likely leaks and assigns colors to the corresponding pixels based on leak likelihood. Finally, the Memory Allocation Visualizer repaints the display (or send data to a graphics subsystem to repaint, redraw, or refresh the display) based on the contents of the RecentPixelList and RecentPixelColorList data structures, at which point the process illustrated by FIG. 13 terminates.

Finally, FIG. 14 provides a general system flow diagram that illustrates exemplary methods for reconstructing a memory map trace displayed during animated playback of filtered events in response to a user initiated zoom or view mode change. In particular, this trace reconstruction process begins by clearing 1400 the PixelList data structure. As discussed above, the PixelList data structure is used to map pixel numbers to event numbers. Next, for each address in the aforementioned MemoryUseDictionary data structure, the Memory Allocation Visualizer selects 1410 the corresponding event and adds filtered events to populate the PixelList using a corresponding one of the aforementioned event selection algorithms based on the currently selected view. Next, the Memory Allocation Visualizer clears 1420 the RecentPixelList data structure and the RecentPixelColorList data structure. Finally, as illustrated by element 1430, the Memory Allocation Visualizer acts to update the displayed pixels (see FIG. 13) by updating the RecentPixelList and the RecentPixelColorList for use in determining the color of the displayed pixels.

It is important to note that the specific implementation of the various data structures described above, in view of FIG. 7 through FIG. 14 provides various processes that makes user initiated operations such as zooming, and/or changing the user selected viewing mode, fast (close to real-time), with the above-described MemoryUseDictionary being one of the data structures that allows rapid view changes and rapid zooming.

2.7 Garbage Collection for Managed Languages

In general, the Memory Allocation Visualizer focuses on unmanaged languages. To support managed languages, additional support for recording and processing garbage collection events from the event trace log is provided in an optional embodiment of the Memory Allocation Visualizer. Adjustments to the animation are then made to display garbage collection results. In particular, since garbage collection involves moving memory blocks, event history from the former location needs to be preserved in the new location. With these changes, managed memory leaks (i.e., unnecessary pointers to objects) can be identified by the Memory Allocation Visualizer using the leak detection heuristics described herein, with the results provided an another type of event in the animation.

3.0 Exemplary Operating Environments

Figure 15:
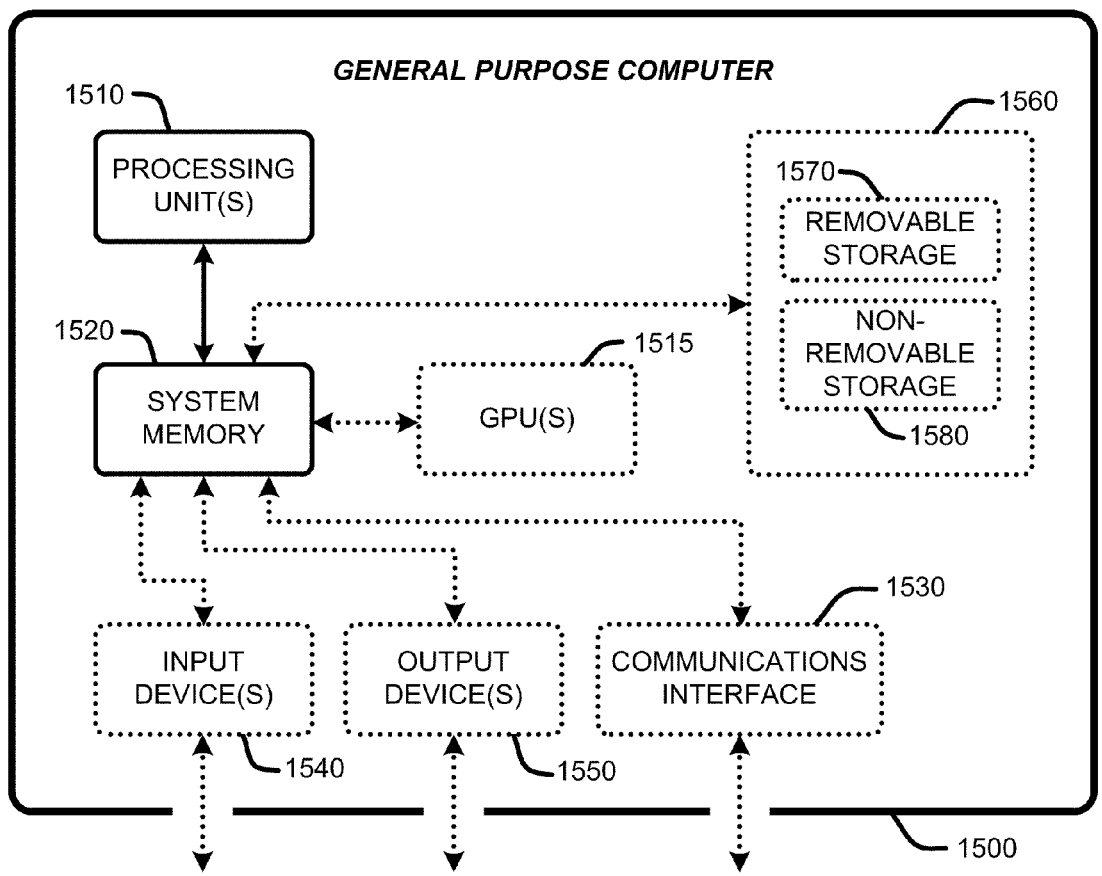
FIG. 15 is a general system diagram depicting a simplified general-purpose computing device having simplified computing and I/O capabilities for use in implementing various embodiments of the Memory Allocation Visualizer, as described herein.

The Memory Allocation Visualizer described herein is operational within numerous types of general purpose or special purpose computing system environments or configurations. FIG. 15 illustrates a simplified example of a general-purpose computer system on which various embodiments and elements of the Memory Allocation Visualizer, as described herein, may be implemented. It should be noted that any boxes that are represented by broken or dashed lines in FIG. 15 represent alternate embodiments of the simplified computing device, and that any or all of these alternate embodiments, as described below, may be used in combination with other alternate embodiments that are described throughout this document.

For example, FIG. 15 shows a general system diagram showing a simplified computing device 1500. Such computing devices can be typically be found in devices having at least some minimum computational capability, including, but not limited to, personal computers, server computers, handheld computing devices, laptop or mobile computers, communications devices such as cell phones and PDAs, multiprocessor systems, microprocessor-based systems, set top boxes, programmable consumer electronics, network PCs, minicomputers, mainframe computers, video media players, etc.

To allow a device to implement the Memory Allocation Visualizer, the device should have a sufficient computational capability and system memory. In particular, as illustrated by FIG. 15, the computational capability is generally illustrated by one or more processing unit(s) 1510, and may also include one or more GPUs 1515, either or both in communication with system memory 1520. Note that that the processing unit(s) 1510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 15 may also include other components, such as, for example, a communications interface 1530. The simplified computing device of FIG. 15 may also include one or more conventional computer input devices 1540. The simplified computing device of FIG. 15 may also include other optional components, such as, for example, one or more conventional computer output devices 1550. Finally, the simplified computing device of FIG. 15 may also include storage 1560 that is either removable 1570 and/or non-removable 1580. Such storage includes computer readable media or machine readable media including, but not limited to, DVDs, CDs, floppy disks, tape drives, hard drives, optical drives, solid state memory devices, etc. Further, software or computer programs or products embodying the some or all of the various embodiments described herein, or portions thereof, may be stored on any desired combination of computer readable media in the form of computer executable instructions. Note that typical communications interfaces 1530, input devices 1540, output devices 1550, and storage devices 1560 for general-purpose computers are well known to those skilled in the art, and will not be described in detail herein.

The foregoing description of the Memory Allocation Visualizer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Memory Allocation Visualizer. It is intended that the scope of the invention be limited not by this detailed description, but rather by the claims appended hereto.

What is claimed is:

1. A method for generating a dynamic visualization of memory allocation events for a computer program, comprising steps for:
   recording a log of memory allocation events occurring during a period of execution of a computer program;
   constructing a data structure of memory allocation events from the log of memory allocation events, the data structure comprising:
      an array of memory event objects, each memory event object comprising information derived from a corresponding event in the log,
      an event index for each memory event object of the array,
      a memory use dictionary that maps from memory addresses to memory usage objects, each memory usage object containing a history of all events for a given memory address over time, and
      a pixel list dictionary that maps from pixel number of a display device to the event index, and that is populated from the memory use dictionary;
   specifying a viewing mode from a set of viewing modes for use in constructing a dynamic visualization of memory allocation events, said viewing mode defining a format for displaying how memory heaps are used over time during the period of execution of the computer program; and rendering an animation of the dynamic visualization of memory allocation events on the display device from the array of memory event objects, the event index, the memory use dictionary and the pixel list dictionary of the data structure of memory allocation events.

2. The method of claim 1 wherein the set of viewing modes comprises viewing the memory allocation information by one of:
   viewing by allocation;
   viewing by age;
   viewing by size;
   viewing by threads;
   viewing by fragmentation; and
   viewing by likely leaks.

3. The method of claim 1 wherein each pixel in a region of the animation is a user selectable graphical representation of one or more contiguous memory addresses in the range of memory addresses that appear in the log, said pixels providing a linear address range of the memory addresses as a 2D display map.

4. The method of claim 3 further comprising steps for repeatedly wrapping the linear range of memory to a next line of the display device such that an upper-left corner of the 2D display map represents a smallest address and the lower-right corner of the display device represents a largest address of the range of memory addresses.

5. The method of claim 3 further comprising steps for:
   generating a display window during playback of the animation in response to user selection of any of the user selectable pixels at a user selected point in time of the animation;
   said display window comprising a display of event information for specific memory addresses corresponding the user selected pixels; and
   wherein the displayed event information correspond to event information recorded in the log at a corresponding time of the execution of the computer program.

6. The method of claim 5 wherein the event information includes one or more of normal allocation behavior, fragmentation events, and likely memory leak events.

7. The method of claim 5 wherein the event information includes one or more of event type, event size, event thread id, number of events, and time since allocation of each memory address.

8. The method of claim 3 further comprising steps for zooming the 2D display map, and wherein the number of memory addresses represented by each user selectable pixel is a direct function of the level of zoom.

9. The method of claim 1 further comprising steps for specifying one or more composable filters for use in constructing the dynamic visualization of memory allocation events said filters providing filtering of the memory allocation events in the log.

10. The method of claim 9 wherein the composable filters include one or more of heaps; threads; source tags; size; functions on call stack; and process names.

11. The method of claim 1 further comprising steps for hiding one or more memory allocations of specific allocation types, age ranges, size ranges, and threads in the animation in response to user identification of the one or more memory allocations of specific allocation types, age ranges, size ranges, and threads via a user interface.

12. The method of claim 3 further comprising steps for automatically displaying a call stack for any events at memory addresses corresponding to any user selected pixels.

13. The method of claim 1 further comprising steps for evaluating the animation to detect likely memory leaks by providing a user interface for controlling display of one or more of memory reuse, declared exceptions, display by size, source, thread, and call stack signature.

14. A system for providing a dynamic display of memory allocations recorded during execution of a computer program, comprising:
   a processing unit; and
   a computer readable medium storing computer executable instructions, said instructions comprising:
   recording a log of memory allocation events occurring during a period of execution of a computer program;
   constructing a data structure of memory allocation events from the log of memory allocation events, the data structure comprising:
      an array of memory event objects, each memory event object comprising information derived from a corresponding event in the log, including event type, event address, event size, event source, thread id, process id, stack signature, saved partial call stack, and time stamp,
      an event index for each memory event object of the array,
      a memory use dictionary that maps from memory addresses to memory usage objects, each memory usage object containing a history of all events for a given memory address over time, and
      a pixel list dictionary that maps from pixel number of a display device to the event index, and that is populated from the memory use dictionary;
   specifying a viewing mode from a set of viewing modes for use in constructing a dynamic visualization of memory allocation events, said viewing mode defining a format for displaying how memory heaps are used over time during the period of execution of the computer program;
   rendering an animation of the dynamic visualization of memory allocation events on the display device from the array of memory event objects, the event index, the memory use dictionary and the pixel list dictionary of the data structure of memory allocation events;
   wherein each pixel in a region of the animation is a user selectable graphical representation of one or more contiguous memory addresses in the range of memory addresses that appear in the log; and
   said pixels providing a linear address range of the memory addresses as a 2D display map that is constructed by repeatedly wrapping the linear range of memory to a next line of the display.

15. The system of claim 14 wherein the set of viewing modes comprises viewing the memory allocation information by one of:
   viewing by allocation;
   viewing by age;
   viewing by size;
   viewing by threads;
   viewing by fragmentation; and
   viewing by likely leaks.

16. The system of claim 14, said instructions further comprising generating a display window during playback of the animation in response to user selection of any of the user selectable pixels at a user selected point in time of the animation, wherein:

the display window provides a display of event information for specific memory addresses corresponding the user selected pixels;

the displayed event information corresponds to event information recorded in the log at a corresponding time of the execution of the computer program; and the event information includes one or more of normal allocation behavior, fragmentation events, and likely memory leak events, event type, event size, event thread id, number of events, and time since allocation of each memory address.

17. The system of claim 14, said instructions further comprising zooming the 2D display map, and wherein the number of memory addresses represented by each user selectable pixel is a direct function of the level of zoom.

18. A DVD, CD, floppy disk, tape drive, hard drive, optical drive, or solid state memory device having computer executable instructions stored therein for generating an interactive animation of memory allocation events, said instructions comprising:

receiving a log of memory allocation events that occurred during a period of execution of a computer program;

constructing a data structure of memory allocation events from the log of memory allocation events, the data structure comprising:

an array of memory event objects, each memory event object comprising information derived from a corresponding event in the log, including event type, event address, event size, event source, thread id, process id, stack signature, saved partial call stack, and time stamp, an event index for each memory event object of the array, a memory use dictionary that maps from memory addresses to memory usage objects, each memory usage object containing a history of all events for a given memory address over time, and a pixel list dictionary that maps from pixel number of a display device to the event index, and that is populated from the memory use dictionary;

specifying a viewing mode from a set of viewing modes for use in constructing a dynamic visualization of memory allocation events, said viewing mode defining a format for displaying how memory heaps are used over time during the period of execution of the computer program;

specifying one or more composable filters for use in constructing the dynamic visualization of memory allocation events said filters providing filtering of the memory allocation events in the log;

rendering an animation of the dynamic visualization of memory allocation events to a display device from the data structure of memory allocation events;

wherein each pixel in a region of the animation is a user selectable graphical representation of one or more contiguous memory addresses in the range of memory addresses that appear in the log;

said pixels providing a linear address range of the memory addresses as a 2D display map that is constructed by repeatedly wrapping the linear range of memory to a next line of the display device; and wherein each pixel is dynamically color coded during playback to represent an allocation status of the corresponding memory addresses as they existed during a corresponding time period of the execution of the computer program.

19. The DVD, CD, floppy disk, tape drive, hard drive, optical drive, or solid state memory device of claim 18, said instructions further comprising specifying a playback speed for the animation relative to the period of execution of the computer program.

20. The DVD, CD, floppy disk, tape drive, hard drive, optical drive, or solid state memory device of claim 18 wherein the animation includes the full range of memory addresses that appear in the log, and wherein an upper-left corner of the 2D display map represents the smallest address and the lower-right corner of the display device represents the largest address of the range of memory addresses.

* * * * *